United States Patent
Oda et al.

(10) Patent No.: US 9,136,944 B2
(45) Date of Patent: Sep. 15, 2015

(54) MEASUREMENT DEVICE, MEASUREMENT METHOD, TRANSFER DEVICE, AND OPTICAL NETWORK

(71) Applicant: FUJITSU LIMITED, Kawasaki-shi, Kanagawa (JP)

(72) Inventors: Shoichiro Oda, Fuchu (JP); Yasuhiko Aoki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 69 days.

(21) Appl. No.: 14/105,960

(22) Filed: Dec. 13, 2013

(65) Prior Publication Data
US 2014/0270756 A1    Sep. 18, 2014

(30) Foreign Application Priority Data
Mar. 15, 2013    (JP) .................................. 2013-054230

(51) Int. Cl.
*H04B 10/079* (2013.01)
(52) U.S. Cl.
CPC ...... *H04B 10/07953* (2013.01); *H04B 10/0791* (2013.01)
(58) Field of Classification Search
CPC ................. H04B 10/0791; H04B 10/07953
USPC .......................................................... 398/26
See application file for complete search history.

(56) References Cited

U.S. PATENT DOCUMENTS

| | | | |
|---|---|---|---|
| 2004/0136357 A1* | 7/2004 | Jo et al. | 370/351 |
| 2004/0223769 A1* | 11/2004 | Hoshida | 398/188 |
| 2008/0232798 A1* | 9/2008 | Kasezawa | 398/34 |
| 2009/0047028 A1* | 2/2009 | Terahara et al. | 398/188 |
| 2011/0058821 A1* | 3/2011 | Goto | 398/195 |
| 2012/0106951 A1 | 5/2012 | Wan et al. | |
| 2012/0155861 A1* | 6/2012 | Liu | 398/26 |

FOREIGN PATENT DOCUMENTS

EP    2 475 113 A1    7/2012
WO    2010/139355 A1    12/2010

OTHER PUBLICATIONS

Extended European Search Report issued Jul. 3, 2014 in corresponding European Patent Application No. 13198028.6.
"OSNR Monitoring Method for OOK and DPSK Based on Optical Delay Interferometer", IEEE Photonics Technology Letters, vol. 19, No. 15, Aug. 1, 2007, pp. 1172-1174.

* cited by examiner

*Primary Examiner* — David Payne
*Assistant Examiner* — Omar S Ismail
(74) *Attorney, Agent, or Firm* — Staas & Halsey LLP

(57) ABSTRACT

A measurement device includes a first obtaining unit configured to obtain a first power ratio that indicates a ratio of optical signal power of a first wavelength in a first spectrum at a reception device to optical signal power of a second wavelength different from the first wavelength in the first spectrum; a second obtaining unit configured to obtain a second power ratio that indicates a ratio of optical signal power of the first wavelength in a second spectrum at a transmission device to optical signal power of the second wavelength in the second spectrum; a calculation unit configured to calculate an OSNR of the optical signal at the reception device using the first power ratio obtained by the first obtaining unit and the second power ratio obtained by the second obtaining unit; and an output unit configured to output the OSNR calculated by the calculation unit.

10 Claims, 16 Drawing Sheets

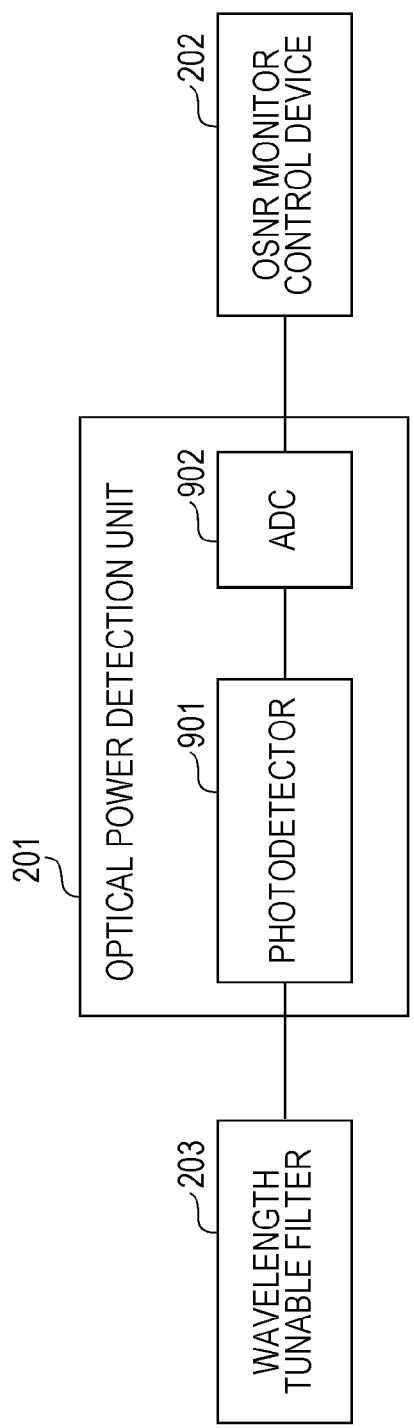
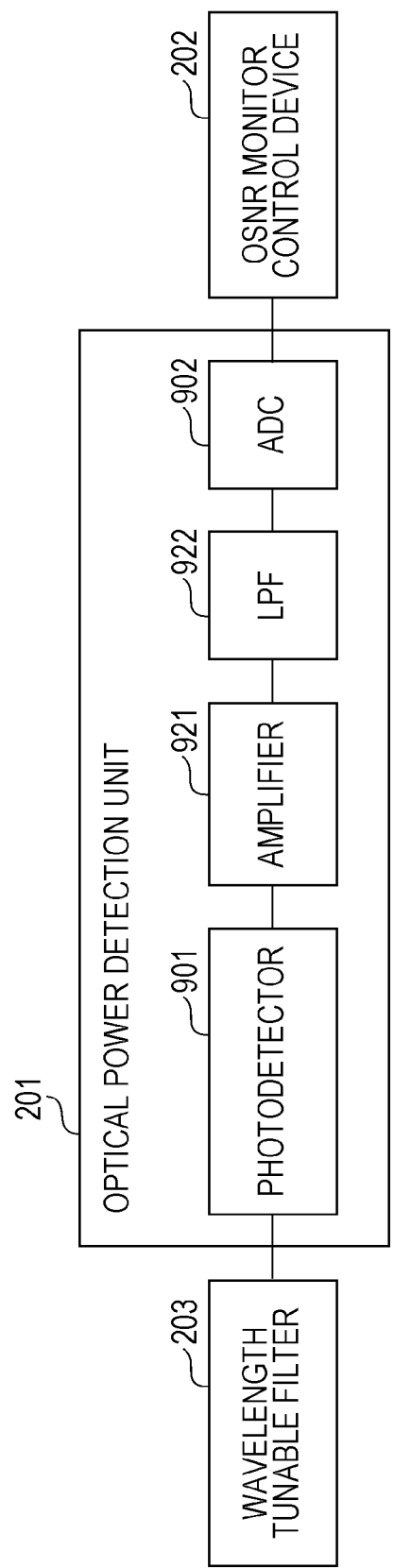

MEASUREMENT DEVICE, MEASUREMENT METHOD, TRANSFER DEVICE, AND OPTICAL NETWORK

CROSS-REFERENCE TO RELATED APPLICATION

This application is based upon and claims the benefit of priority from the prior Japanese Patent Application No. 2013-054230 filed on Mar. 15, 2013, the entire contents of which are incorporated herein by reference.

FIELD

The embodiments discussed herein are related to a measurement device, a measurement method, a transfer device, and an optical network.

BACKGROUND

In related arts, a technology is known by which an optical signal-to-noise ratio (OSNR) is analyzed based on an optical signal received by a transfer device in an optical network in order to detect malfunction and failure. For example, there is a technology in which filtering is performed, by a narrow band optical filter, on an optical signal on which superimposition of AM modulation is performed in the vicinity of the signal central wavelength and at a point that is shifted from the signal center wavelength by a certain wavelength portion, and an OSNR is measured from a ratio of a direct current (DC) component to an alternating current (AC) component after photoelectric conversion (for example, United State Patent Application Publication No. 2012/0106951). In addition, there is a technology in which an OSNR is measured from a ratio of peak power to trough power in light that is permeated through an optical filter having a certain permeation characteristic (for example, X. Liu, et al. "OSNR Monitoring Method for OOK and DPSK Based on Optical Delay Interferometer", IEEE PHOTONICS TECHNOLOGY LETTERS, VOL. 19, NO. 15, Aug. 1, 2007, Pp. 1172-1174).

However, in the above-described related arts, a configuration for measuring an OSNR is complicated.

SUMMARY

According to an aspect of the embodiments, a measurement device includes a first obtaining unit configured to obtain a first power ratio that indicates a ratio of optical signal power of a first wavelength in a first spectrum at a reception device to optical signal power of a second wavelength different from the first wavelength in the first spectrum; a second obtaining unit configured to obtain a second power ratio that indicates a ratio of optical signal power of the first wavelength in a second spectrum at a transmission device to optical signal power of the second wavelength in the second spectrum; a calculation unit configured to calculate an OSNR of the optical signal at the reception device using the first power ratio obtained by the first obtaining unit and the second power ratio obtained by the second obtaining unit; and an output unit configured to output the OSNR calculated by the calculation unit.

The object and advantages of the invention will be implemented and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9A is a diagram illustrating an example of a detailed configuration of an optical power detection unit;

FIG. 9B is a diagram illustrating an example of another detailed configuration of the optical power detection unit;

DESCRIPTION OF EMBODIMENTS

A measurement device, a measurement method, a transfer device, and optical network according to the embodiments are described in detail with reference to accompanying drawings.

Figure 1:
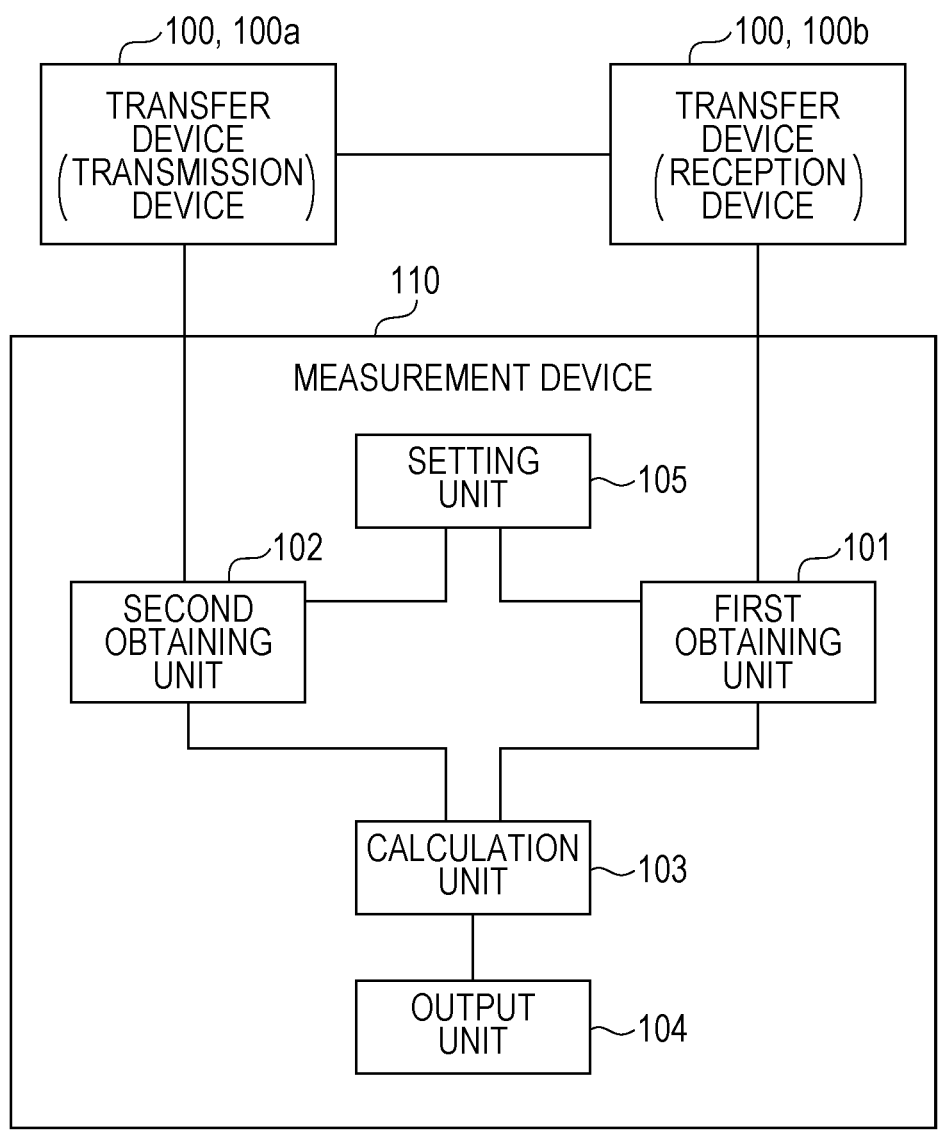
FIG. 1 is a diagram illustrating an example of a functional configuration of a transfer device according to an embodiment.

FIG. 1 is a diagram illustrating an example of a functional configuration of a transfer device according to an embodiment. In FIG. 1, a transfer device 100 includes a transmission device 100a on a transmission side and a reception device 100b on a reception side. The transmission device 100a and the reception device 100b are connected to a measurement device 110. In the embodiment, the measurement device 110 is included in the reception device 100b, but may be included in the transmission device 100*a* or an external device other than the transmission device 100*a* and the reception device 100*b*.

The measurement device 110 includes a first obtaining unit 101, a second obtaining unit 102, a calculation unit 103, an output unit 104, and a setting unit 105. The first obtaining unit 101 obtains, from the reception device 100*b*, information on a spectrum shape obtained on the basis of optical signal power of a first wavelength in a first spectrum and optical signal power (hereinafter also referred simply to power) of a second wavelength in the first spectrum at the reception device 100*b* received from the transmission device 100*a*. The first wavelength and the second wavelength are different.

The information on the spectrum shape is information on a first power ratio that indicates a ratio of the power of the first wavelength to the power of the second wavelength in the first spectrum, but may be information that indicates the shape of the first spectrum and indicates a relationship between a wavelength and power. The first power ratio is a ratio of the power of the first wavelength to that of the second wavelength at the reception device 100*b*. The measurement of the first power ratio is performed, for example, in the reception device 100*b*, but may be performed in the transmission device 100*a* or another device.

The second obtaining unit 102 obtains, from the transmission device 100*a*, information on a spectrum shape obtained from power of a first wavelength in a second spectrum and power of a second wavelength in the second spectrum in the transmission device 100*a*. The information on the spectrum shape is information on a second power ratio that indicates a ratio of the power of the first wavelength in the second spectrum to the power of the second wavelength in the second spectrum, but may be information that indicates the shape of the second spectrum and indicates a relationship between a wavelength and power.

The second power ratio is a ratio of the power of the first wavelength to the power of the second wavelength in the transmission device 100*a*, and for example, a calibration coefficient that is used to calculate an OSNR. The measurement of the second power ratio is performed in the transmission device 100*a*, but may be performed in the reception device 100*b* or another device.

The calculation unit 103 calculates an OSNR of the received optical signal using the first power ratio that is obtained by the first obtaining unit 101 and the second power ratio that is obtained by the second obtaining unit 102. The calculation unit 103 calculates an OSNR using a certain OSNR calculation formula. The output unit 104 outputs the OSNR that is calculated by the calculation unit 103.

Here, a case is described below in which the optical signal is a single carrier signal. In this case, the first wavelength is a wavelength in which the power becomes maximum in the spectrum of the optical signal. In addition, the second wavelength is a wavelength in which a difference between the power in the first spectrum and the power in the second spectrum is a threshold value or less. The difference corresponds to, for example, delta and a ratio. The threshold value indicates limit of allowable spectrum narrowing.

The second wavelength is a wavelength that is the farthest from the first wavelength, out of the wavelengths in which the difference is the threshold value or less. That is, the second wavelength is a wavelength in which the difference between the signal power levels becomes maximum, out of the wavelengths in which the difference is the threshold value or less, and also a wavelength that indicates the limit of allowable spectrum narrowing.

The first wavelength and the second wavelength are set by the setting unit 105. The setting unit 105 sets the first wavelength and the second wavelength on the basis of first spectrum information that indicates the first spectrum and second spectrum information that indicates the second spectrum. The first spectrum information is information that indicates the shape of the first spectrum, and the second spectrum information is information that indicates the shape of the second spectrum. The setting unit 105 may set the second wavelength that is less affected by spectrum narrowing and in which the power of the optical signal is large, using the first spectrum information and the second spectrum information.

In addition, there is a case in which a deviation of wavelengths occurs between the transmission device 100*a* and the reception device 100*b*. In this case, the setting unit 105 performs wavelength shift on at least one of the first spectrum and the second spectrum in a direction in which a deviation between a wavelength in which the power is maximum in the first spectrum and a wavelength in which the power is maximum in the second spectrum becomes small. The wavelength shift may be performed so that the first spectrum is pulled over to the second spectrum or performed so that the second spectrum is pulled over to the first spectrum.

In addition, the respective spectrums may be shifted by the half of the deviation amount between the wavelengths of the first spectrum and the second spectrum in the direction in which the deviation becomes small. The setting unit 105 sets the first wavelength and the second wavelength on the basis of at least one of the first spectrum and the second spectrum on which wavelength shift is performed. Therefore, the setting unit 105 may set the first wavelength and the second wavelength by considering a deviation of wavelengths that occurs between the transmission device 100*a* and the reception device 100*b*.

In addition, the setting of the first wavelength and the second wavelength is performed in the setting unit 105 that is included in the reception device 100*b*, but may be performed in the transmission device 100*a* or another device. When the setting of the first wavelength and the second wavelength is performed in the transmission device 100*a*, the first obtaining unit 101 may obtain a first power ratio on the basis of information that indicates the first wavelength and the second wavelength, which is transmitted from the transmission device 100*a*. In addition, the second obtaining unit 102 may obtain a second power ratio on the basis of the information that indicates the first wavelength and the second wavelength, which is transmitted from the transmission device 100*a*.

Here, a case is described below in which the optical signal is a multi-carrier signal. The multi-carrier signal composed of a plurality of carriers having individual wavelengths that are adjacent to each other with a band in a spectrum. Here, the number of carriers is two or more. The multi-carrier signal has a high transmission capability as compared with the single carrier signal. When the optical signal is the multi-carrier signal, the second wavelength is a wavelength in the band. In addition, the first wavelength is a wavelength that is shifted by a certain amount from the second wavelength. The certain amount is, for example, an amount of a band or less of a single carrier signal.

The first wavelength and the second wavelength are set by the setting unit 105. The setting unit 105 sets a wavelength in a band as a second wavelength and sets the wavelength that is shifted by a certain amount from the second wavelength as a first wavelength on the basis of band information on bands of the plurality of carrier signals. Even in the multi-carrier signal, when a deviation of wavelengths occurs between the transmission device 100*a* and the reception device 100*b*, the setting unit 105 may perform wavelength shift on at least one of the first spectrum and the second spectrum in a direction in which the deviation becomes small. In addition, the setting unit 105 may set the first wavelength and the second wavelength on the basis of at least one of the first spectrum and the second spectrum on which wavelength shift is performed.

In addition, a network control device (not illustrated) is provided between the transmission device 100a and the reception device 100b so as to communicate with the transmission device 100a and the reception device 100b, the second obtaining unit 102 may obtain a second power ratio from the transmission device 100a through the network control device. The network control device manages a calibration coefficient that is the second power ratio and wavelength information of the first wavelength and the second wavelength. In addition, when the network control device is not provided between the transmission device 100a and the reception device 100b, the second obtaining unit 102 may obtain the second power ratio by a control signal that the measurement device 110 receives directly from the transmission device 100a.

As described above, in the embodiment, an OSNR of an optical signal of interest may be obtained with a simple configuration by measuring the OSNR using information on spectrum shapes of the optical signal at the reception device and the transmission device. For example, the OSNR may be obtained with a simple configuration because a Mach-Zehnder interferometer filter is not used and superposition of AM modulation is not performed on the optical signal. In addition, in the embodiment, the OSNR may be measured highly accurately regardless of the spectrum narrowing.

Figure 2:
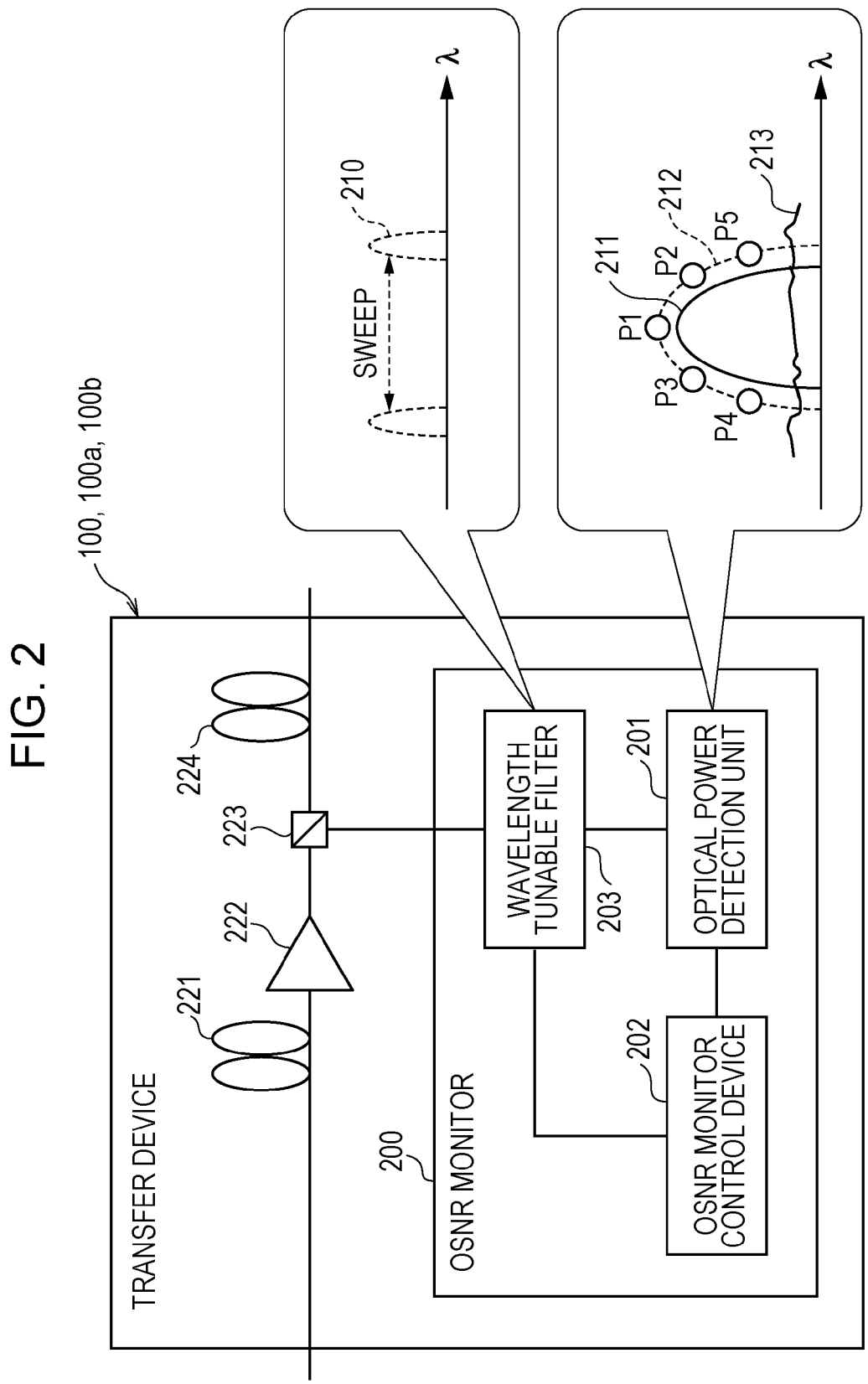
FIG. 2 is a diagram illustrating an example of a measurement method of an OSNR.

A measurement method of an OSNR is described below with reference to FIG. 2. FIG. 2 is a diagram illustrating an example of the measurement method of an OSNR. In FIG. 2, a case is described below in which information is transmitted by a single carrier signal. In FIG. 2, the transfer device 100 includes an OSNR monitor 200, an optical fiber 221, an amplifier 222, a coupler 223, and an optical fiber 224.

The optical fiber 221 outputs a light that is received from the transmission device 100a, to the amplifier 222. The amplifier 222 amplifies the light that is output from the optical fiber 221 and outputs the amplified light to the coupler 223. The coupler 223 partially branches the light that is output from the amplifier 222 to output the light to the OSNR monitor 200 and the optical fiber 224. The optical fiber 224 outputs the light that is outputs from the coupler 223 to another reception device 100b.

The OSNR monitor 200 includes an optical power detection unit 201, an OSNR monitor control device 202, and a wavelength tunable filter 203. The wavelength tunable filter 203 permeates light having a permeation shape 210 of the light that is output from the coupler 223.

The optical power detection unit 201 detects power of the light having the permeation shape 210, which is permeated through the wavelength tunable filter 203 of the measured signal that is output from the coupler 223. The OSNR monitor control device 202 controls sweep of the wavelength tunable filter 203. The OSNR monitor control device 202 controls the center wavelength of the light that is permeated through the wavelength tunable filter 203.

For example, the OSNR monitor control device 202 determines the center wavelength of the light that is permeated through the wavelength tunable filter 203, that is, the detection wavelength of the optical power that is detected by the optical power detection unit 201, as a wavelength that is less affected by spectrum narrowing. The OSNR monitor control device 202 outputs a monitoring result 212 that indicates a spectrum 211 using the optical power that is detected by the optical power detection unit 201.

In addition, the OSNR monitor control device 202 obtains optical power of two points (for example, power P1 in the first wavelength and power P2 in the second wavelength) of P1 to P5 that are indicated in the monitoring result 212. The OSNR monitor control device 202 obtains the optical power of the two points of P1 that is the maximum power and P2 that is different from P1 in the monitoring result 212. The setting of the first wavelength and the second wavelength is described later with reference to FIG. 3. Amplified spontaneous emission (ASE) noise 213 is noise that is obtained by amplifying spontaneous emission light in the amplifier 222 or the like.

The OSNR monitor control device 202 calculates an OSNR using the obtained optical power in accordance with the following formulas (1) to (4).

$$P1 = P_{ASE} + P_{sig} \quad (1)$$

$$P2 = P_{ASE} + dP_{sig} \quad (2)$$

$$R = P1/P2 \quad (3)$$

$$OSNR = P_{sig}/P_{ASE} = (1-R)/(Rd-1) \quad (4)$$

Here, "$P_{ASE}$" represents power of ASE noise. In addition, "$P_{sig}$" represents the maximum optical power that corresponds to the first wavelength. In addition, "d" represents a calibration coefficient. The measurement method of a calibration coefficient is described later with reference to FIG. 4. As illustrated in the formula (4), "OSNR" is represented by a power ratio R between the two points of the optical power P1 in the first wavelength and the optical power P2 in the second wavelength and the calibration coefficient d. The power ratio R is the first power ratio, and the calibration coefficient d is the second power ratio. An OSNR may be calculated as described above. Hereinafter, the formulas (1) to (4) are referred to as OSNR calculation formulas.

Figure 3:
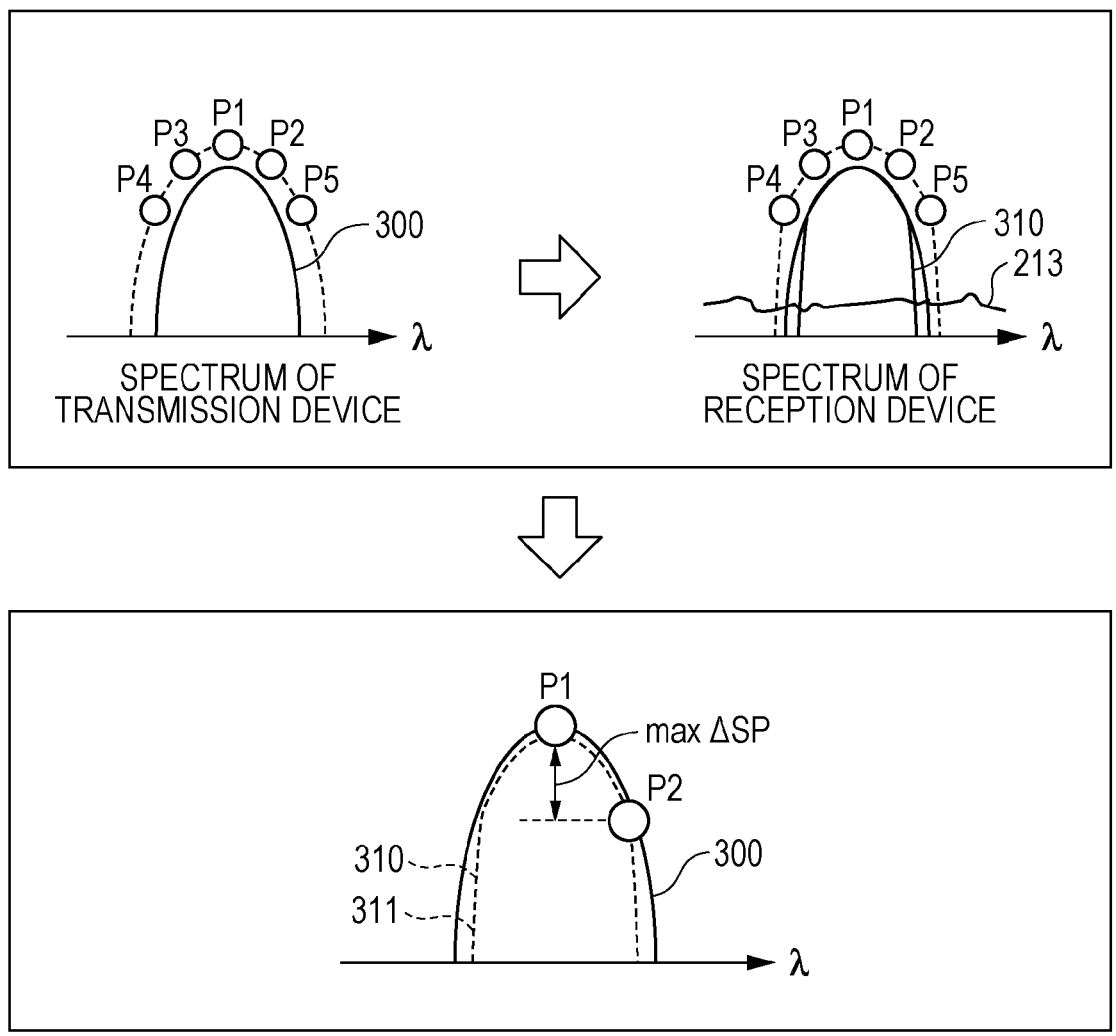
FIG. 3 is a diagram illustrating an example of a setting method of a first wavelength and a second wavelength.

An example of a setting method of two points of P1 and P2 out of monitor outputs P1 to P5 is described below with reference to FIG. 3. FIG. 3 is a diagram illustrating an example of a setting method of a first wavelength and a second wavelength. As illustrated in FIG. 3, when a single carrier signal is used, a spectrum 300 of the transmission device 100a and a spectrum 310 of the reception device 100b have a convex shape. In the spectrum 310 of the reception device 100b, as a wavelength is far away from the center wavelength that is the first wavelength, spectrum narrowing occurs in which a tail portion 311 of the spectrum 310 that has the convex shape is reduced as compared with the spectrum 300 of the transmission device 100a.

In addition, in the embodiment, in the spectrum 300 and the spectrum 310, the wavelength that corresponds to P1 in which the optical power reaches a peak is set as the first wavelength. When there is a deviation between a first wavelength in which the optical power reaches a peak in the spectrum 300 and a first wavelength in which the optical power reaches a peak in the spectrum 310, wavelength shift is performed so that one of the spectrums is pulled over the other spectrum.

In addition, in the spectrum 300 and the spectrum 310, a second wavelength is calculated in accordance with the following formulas (5) and (6).

$$\max \Delta SP = SP_{in\_P1} - SP_{in\_Y} \quad (5)$$

$$SP_{in\_X} - SP_{out\_X} \leq \alpha (Y \in X) \quad (6)$$

Here, "$SP_{in\_P1}$" represents power in the first wavelength in the reception device 100b. In addition, "$SP_{in\_Y}$" represents power in a wavelength Y in the reception device 100b. In addition, "$SP_{in\_X}$" represents power in a wavelength X in the transmission device 100a. In addition, "$SP_{out\_X}$" represents power in a wavelength X in the reception device 100b. In addition, "α" represents a maximum value of delta between power levels of optical signals in the transmission device 100a and the reception device 100b, and is, for example, a value that indicates the limit of allowable spectrum narrowing.

Here, "max ΔSP" represents the maximum value of delta between the power of P1 and the power of the wavelength Y in a range of "X" that satisfies the condition of the formula (6). Using the formulas (5) and (6), the wavelength X of the P2 that satisfies "max ΔSP" may be set as the second wavelength. Hereinafter, the formulas (5) and (6) are referred to as wavelength condition formulas.

As described above, in the embodiment, by comparing the spectrum 300 of the transmission device 100a with the spectrum 310 of the reception device 100b, a wavelength that is less affected by spectrum narrowing may be set as the second wavelength. The setting of the first wavelength and the second wavelength may be performed in the transmission device 100a or the reception device 100b.

Figure 4:
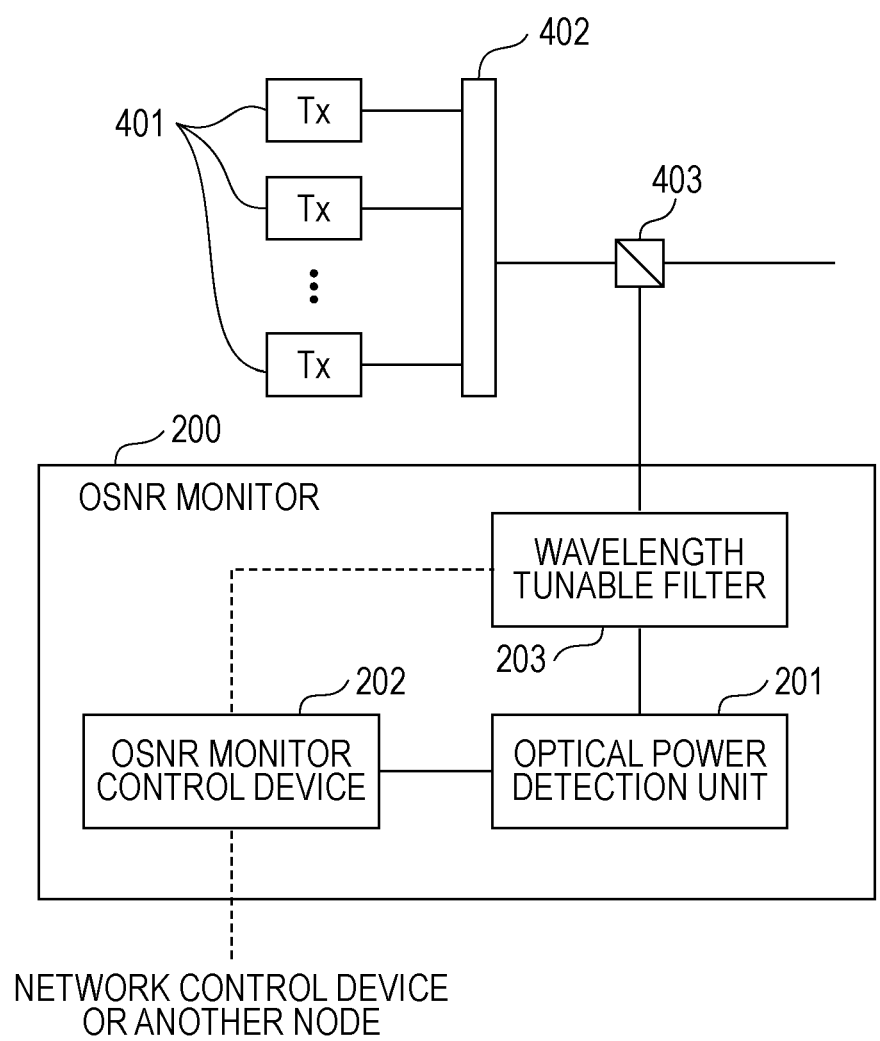
FIG. 4 is a diagram illustrating an example of a configuration of a transmission device that measures a calibration coefficient d.

An example of a measurement method of a calibration coefficient d, which is performed by the transmission device 100a, is described below with reference to FIG. 4. FIG. 4 is a diagram illustrating an example of a configuration of the transmission device that measures a calibration coefficient d. In FIG. 4, the transmission device 100a includes transmitters 401, a wavelength multiplexing unit 402, and a coupler 403. The transmitter 401 converts an input electrical signal for each wavelength into an optical signal, and outputs the optical signal to the wavelength multiplexing unit 402. The wavelength multiplexing unit 402 performs wavelength multiplexing on the optical signals having different wavelengths, which are output from the transmitters 401 and outputs the light to the coupler 403. The coupler 403 partially branches the light that is output from the wavelength multiplexing unit 402 to output the light to the OSNR monitor 200.

The OSNR monitor 200 of the transmission device 100a measures optical power P'1 in a first wavelength in the transmission device 100a and optical power P'2 in a second wavelength in the transmission device 100a. The calibration coefficient d may be calculated in accordance with the following formulas (7) and (8).

$$P'1 = P_{sig} \quad (7)$$

$$P'2 = dP_{sig} \quad (8)$$

$$\therefore d = P'2/P'1$$

The transmission device 100a has small ASE noise as compared with the reception device 100b. Therefore, when a calibration coefficient d is calculated in the transmission device 100a, a highly accurate calibration coefficient d may be obtained as compared with the reception device 100b. Even when a calibration coefficient d is calculated in the transmission device 100a using a signal that has passed through the amplifier, an effect of the ASE noise is negligible, so that a highly accurate calibration coefficient d may be obtained. In addition, when a signal that does not pass through the amplifier yet is used in the transmission device 100a, a calibration coefficient d may be measured in a state in which there is no ASE noise, so that a higher accurate calibration coefficient d may be obtained. Hereinafter, the formulas (7) and (8) are referred to as calibration coefficient calculation formulas.

Here, in the reception device 100b, a calibration coefficient may be corrected by considering an effect of spectrum narrowing that is caused when the optical signal passes through a wavelength select switch (WSS). For example, the number of steps through which the optical signal passes in the WSS and a change amount Δd of the calibration coefficient d when the optical signal passes through one step in the WSS are stored in the reception device 100b beforehand, and an OSNR may be monitored in accordance with the following formulas (9) and (10).

$$d' = k \times \Delta d \times d \quad (9)$$

$$\Delta d = P_b/P_a \quad (10)$$

Here, "k" represents the number of steps through which the optical signal passes in the WSS. In addition, "Δd" represents a change amount of the calibration coefficient d when the optical signal passes through one step in the WSS, and a value that is set beforehand. In addition, "$P_a$" represents optical power in a first wavelength in which the optical power reaches a peak, out of wavelengths of two points that are used in the OSNR monitor 200. In addition, "$P_b$" represents optical power in a second wavelength that is different from the first wavelength, out of the wavelengths of the two points that are used in the OSNR monitor 200. As described above, "Δd" may be represented as a permeation power ratio in the wavelengths of the two points that are used in the OSNR monitor 200.

As described above, an OSNR may be monitored by considering an effect of spectrum narrowing that is caused when the optical signal passes through the WSS, so that the calibration coefficient may be corrected depending on spectrum narrowing in the reception device 100b. Therefore, an OSNR may be measured highly accurately.

Figure 5:
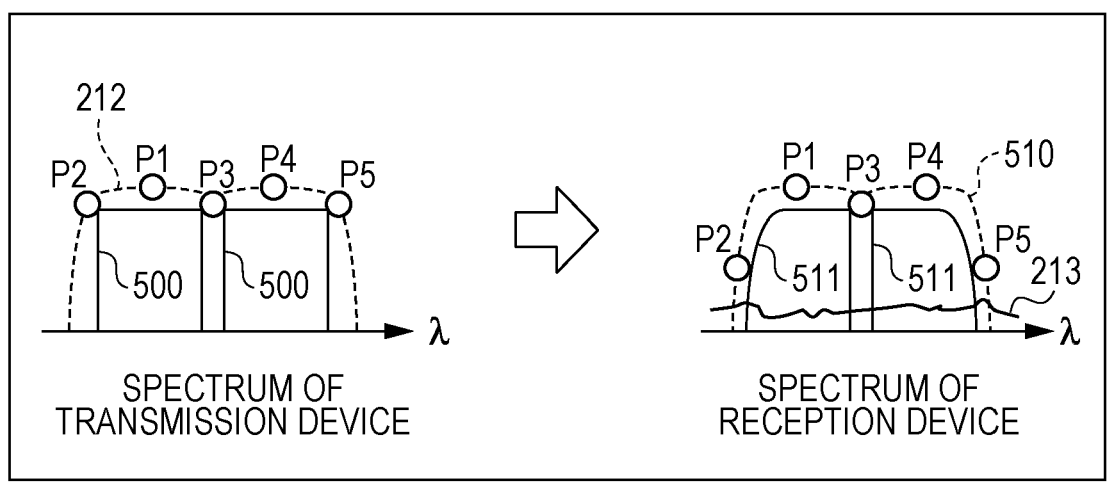
FIG. 5 is a diagram illustrating power of a multi-carrier signal.

An example of a measurement method of an OSNR for a multi-carrier signal is described below with reference to FIG. 5. FIG. 5 is a diagram illustrating power of the multi-carrier signal. As illustrated in FIG. 5, the multi-carrier signal has a spectrum in which two carrier signals 500 having square shapes are combined. In a single carrier signal, for example, there is a transmission capability of 100 Gbps, but in a multi-carrier signal, for example, there is a transmission capability of 400 Gbps.

When the multi-carrier signal is used, the optical power detection unit 201 detects power of light having a permeation shape 510, which is permeated through the wavelength tunable filter 203, of measured signal that is output from the coupler 223 (see FIG. 2). The OSNR monitor control device 202 controls sweep of the wavelength tunable filter 203 and controls the center wavelength of light that is permeated through the wavelength tunable filter 203. The side portions of the spectrum in transmission device 100a have vertical shapes, but the side portions of a spectrum 511 in the reception device 100b have arched shapes, so that spectrum narrowing occurs.

The OSNR monitor control device 202 obtains data on power level of two points (for example, P1 and P3) of P1 to P5 that are indicated in a monitoring result 212. Here, P3 is optical power in a second wavelength and is located in a band between the carrier signals 500. In addition, P3 substantially corresponds to the center wavelength of the multi-carrier signal, and is optical power that is smaller than the maximum optical power in the monitoring result 212. In addition, the P1 is the maximum optical power in the spectrum of the optical signal and is defined beforehand in a location that is shifted to the left side from the P3 by a certain amount.

The OSNR monitor control device 202 controls the center wavelength of light that is permeated through the wavelength tunable filter 203. For example, the OSNR monitor control device 202 determines the center wavelength of the light that is permeated through the wavelength tunable filter 203, that is, the detection wavelength of optical power that is detected by the optical power detection unit 201, as a wavelength that is less affected by spectrum narrowing. The OSNR monitor control device 202 calculates an OSNR using the obtained optical power in accordance with the following formulas.

$$P1 = P_{ASE} + P_{sig} \quad (1)$$

$$P3 = P_{ASE} + dP_{sig} \quad (11)$$

$$R = P1/P3 \quad (12)$$

$$OSNR = P_{sig}/P_{ASE} = (1-R)/(Rd-1) \quad (4)$$

Here, "$P_{ASE}$" represents power of ASE noise. In addition, "$P_{sig}$" represents the maximum optical power that corresponds to the first wavelength. In addition, "d" represents a calibration coefficient. As indicated in the formula (4), "OSNR" may be represented by a calibration coefficient d and a power ratio R between two points of the optical power P1 in the first wavelength and the power P3 at the center of the multi-carrier signal, which corresponds to the second wavelength. An OSNR may be calculated as described above. Similar to the above-described formulas (1) to (4), the formulas (1), (4), (11), and (12) are referred to as OSNR calculation formulas.

As described above, when a multi-carrier signal is used, a wavelength that corresponds to the maximum power is set as a first wavelength, and a wavelength that corresponds to the center wavelength of the multi-carrier signal is set as a second wavelength. As described above, by setting the wavelength that corresponds to the center wavelength of the multi-carrier signal as a second wavelength, the second wavelength may be set easily, which may cause a first wavelength to be set easily. In addition, a wavelength that is less affected by spectrum narrowing may set as a second wavelength, so that an OSNR may be measured highly accurately.

Figure 6A:
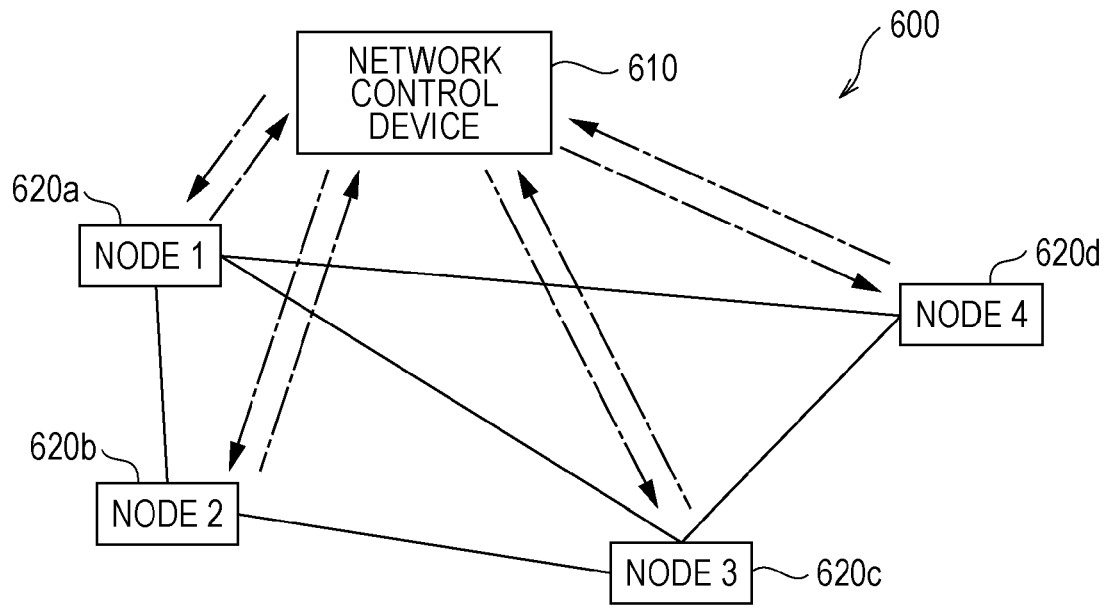
FIG. 6A is a diagram illustrating an example when a node according to the embodiment is used for an optical network.

FIG. 6A is a diagram illustrating an example when a node according to the embodiment is used for an optical network. As illustrated in FIG. 6A, an optical network 600 includes a network control device 610 and a plurality of nodes 620 (620a, 620b, 620c, and 620d). Each of the nodes 620 includes the transfer device 100, and the nodes 620 are connected to each other so as to communicate with each other to perform transmission and reception of an optical signal. In addition, each of the nodes 620 is connected to the network control device 610 to perform transmission and reception of an optical signal.

The network control device 610 manages wavelength setting information and calibration value information and transmits the information to each of the nodes 620. The network control device 610 may be included in one of the nodes 620. In such a configuration, the node 620 may share the wavelength setting information and the calibration value information that are managed by the network control device 610.

Figure 6B:
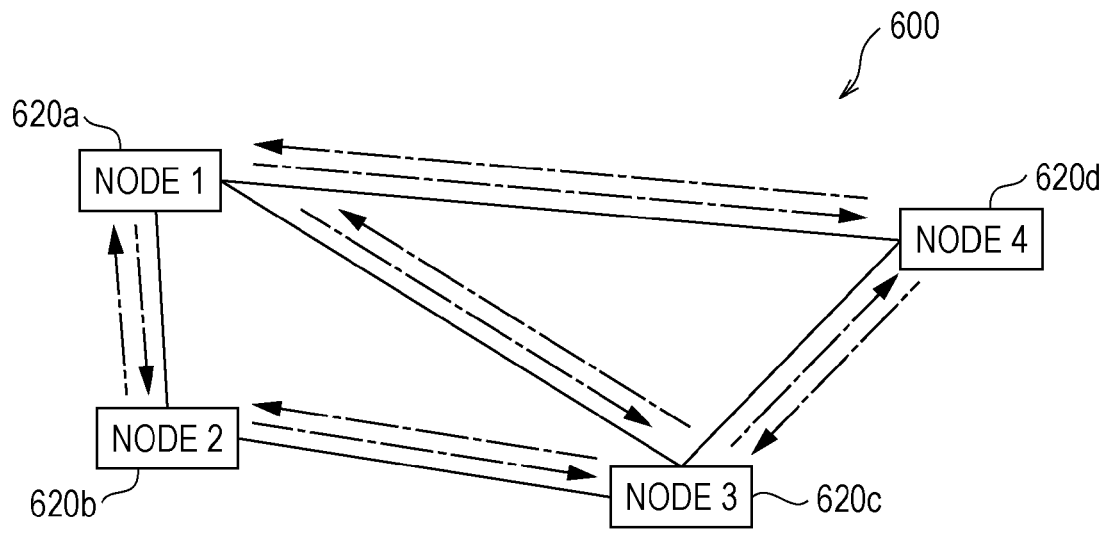
FIG. 6B is a diagram illustrating another example when the node according to the embodiment is used for an optical network.

FIG. 6B is a diagram illustrating another example when the node according to the embodiment is used for an optical network. As illustrated in FIG. 6B, the optical network 600 includes a plurality of nodes 620. The nodes 620 are connected to each other so as to communicate with each other. The nodes 620 may share the wavelength setting information and the calibration value information using monitoring control channels.

Figure 7A:
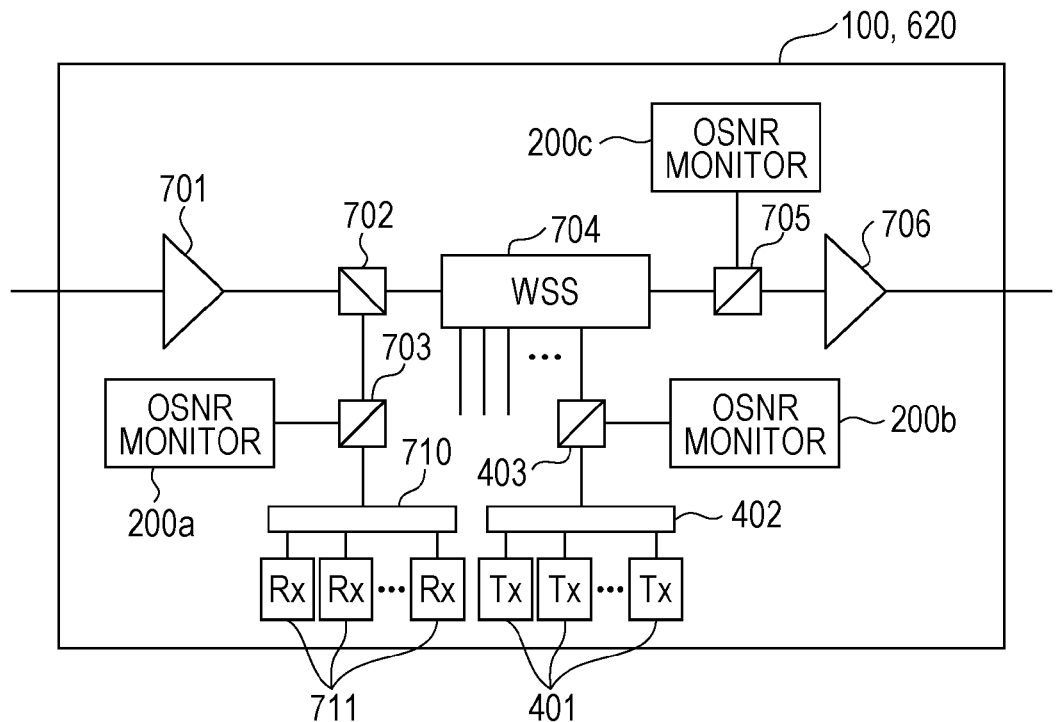
FIG. 7A is a diagram illustrating an example of a configuration of the transfer device.
Figure 7B:
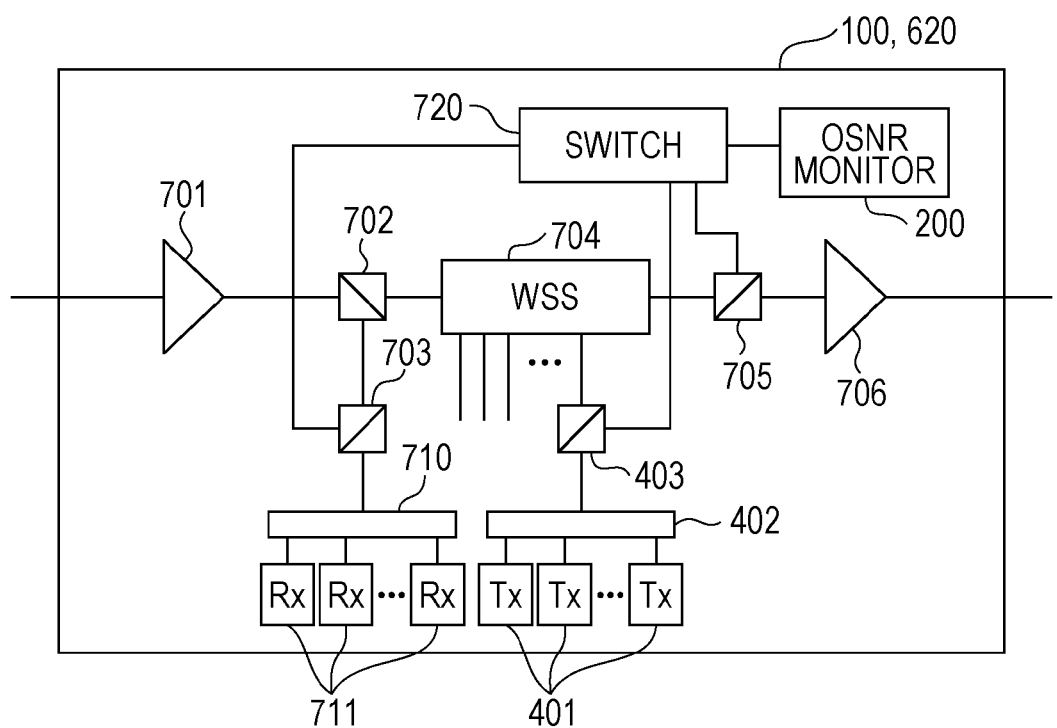
FIG. 7B is a diagram illustrating an example of another configuration of the transfer device.

An example of a configuration of the transfer device 100 (node 620) is described below with reference to FIGS. 7A and 7B. In FIGS. 7A and 7B, to configuration elements similar to that of FIGS. 1 to 5, the same reference numerals are given, and the description is omitted herein.

FIG. 7A is a diagram illustrating an example of a configuration of the transfer device. As illustrated in FIG. 7A, the transfer device 100 includes an amplifier 701, couplers 702, 703, and 705, a WSS 704, the coupler 403, an amplifier 706, the wavelength multiplexing unit 402, a wavelength demultiplexing unit 710, and three OSNR monitors 200a, 200b, and 200c.

The amplifier 701 amplifies an optical signal that is input from another transfer device 100 and outputs the amplified optical signal to the coupler 702. The coupler 702 partially branches the light that is output from the amplifier 701 to output the light to the WSS 704 and the coupler 703.

The coupler 703 partially branches the light that is output from the coupler 702 to output the light to the OSNR monitor 200a and the wavelength demultiplexing unit 710. The wavelength demultiplexing unit 710 separates the light that is output from the coupler 703 into optical signals having different wavelengths, and outputs the optical signals to receivers 711. The receiver 711 converts the optical signal that is output from the wavelength demultiplexing unit 710 into an electrical signal.

The OSNR monitor 200a calculates an OSNR using the light that is output from the coupler 703. The wavelength multiplexing unit 402 performs wavelength multiplexing on the optical signals having different wavelengths that are output from the transmitters 401 and outputs the light to the coupler 403. The coupler 403 partially branches the light that is output from the wavelength multiplexing unit 402 to output the light to the OSNR monitor 200b and the WSS 704. The OSNR monitor 200b calculates a calibration coefficient using the light that is output from the coupler 403.

The WSS 704 causes a wavelength on which arbitrary setting is performed to pass through an arbitrary path or to be branched. The WSS 704 outputs light of the wavelength on which arbitrary setting is performed to the coupler 705. The coupler 705 partially branches light that is output from the WSS 704 to output the light to the OSNR monitor 200c and the amplifier 706. The amplifier 706 amplifies the light that is output from the coupler 705 and outputs the amplified light to another node. The OSNR monitor 200c monitors a signal that passes through the coupler 705.

FIG. 7B is a diagram illustrating an example of another configuration of the transfer device. As illustrated in FIG. 7B, the transfer device 100 includes the single OSNR monitor 200 and a switch 720. The OSNR monitor 200 may select one monitor to be monitored out of the couplers 702, 703, and 705 by controlling the switch 720.

For example, the OSNR monitor 200 calculates an OSNR using the light output from the coupler 703 by controlling the switch 720 and setting the coupler 703 as a monitor to be monitored. In addition, the OSNR monitor 200 calculates a calibration coefficient using the light that is output from the coupler 403 by controlling the switch 720 and setting the coupler 403 as a monitor to be monitored. In addition, the OSNR monitor 200 monitors a signal that passes through the coupler 705 by controlling the switch 720 and setting the coupler 705 as a monitor to be monitored.

As described above, the transmission device 100 illustrated in FIG. 7B may select a monitor to be monitored by the switch 720, and measures an OSNR and calculate a calibration coefficient using the single OSNR monitor 200.

Figure 8:
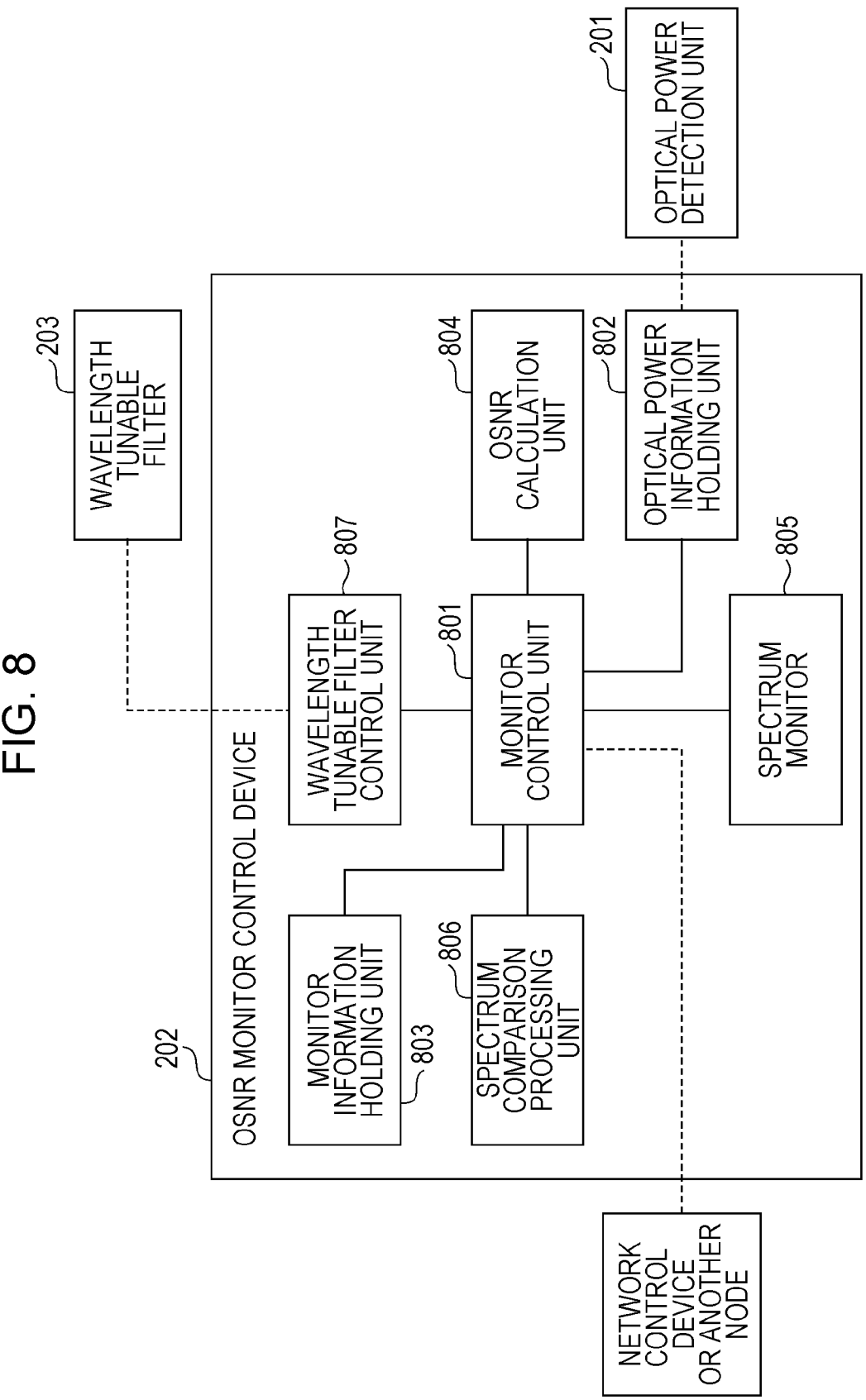
FIG. 8 is a diagram illustrating an example of a detailed configuration of an OSNR monitor control device.

FIG. 8 is a diagram illustrating an example of a detailed configuration of the OSNR monitor control device. As illustrated in FIG. 8, the OSNR monitor control device 202 includes a monitor control unit 801, an optical power information holding unit 802, a monitor information holding unit 803, an OSNR calculation unit 804, a spectrum monitor 805, a spectrum comparison processing unit 806, and a wavelength tunable filter control unit 807. The monitor control unit 801 controls each of the elements 802 to 807 and controls connection with the network control device 610 or another node.

The optical power information holding unit 802 holds a detection result of optical power detected by the optical power detection unit 201. The monitor information holding unit 803 holds calibration coefficient information and wavelength information of a first wavelength and a second wavelength. The OSNR calculation unit 804 calculates an OSNR using the detection result of the optical power, which is held in the optical power information holding unit 802 and the calibration coefficient held in the monitor information holding unit 803, in accordance with a certain OSNR calculation formula.

The spectrum monitor 805 monitors a spectrum of the optical signal. The spectrum comparison processing unit 806 compares a spectrum that is measured in the spectrum monitor 805 of the transmission device 100a with a spectrum that is measured in the spectrum monitor 805 of the reception device 100b, and determines a second wavelength in a location in which the spectrum narrowing is small. The determined second wavelength is held in the monitor information holding unit 803 as wavelength information with a first wavelength in which the optical power reaches a peak. The wavelength tunable filter control unit 807 controls the wavelength tunable filter 203 using the wavelength information of the first wavelength and the second wavelength, which is held in the monitor information holding unit 803.

The monitor control unit 801, the OSNR calculation unit 804, the spectrum monitor 805, the spectrum comparison processing unit 806, and the wavelength tunable filter control unit 807 may use at least one of a central processing unit (CPU), a field programmable gate array (FPGA), and the like. In addition, the optical power information holding unit 802 and the monitor information holding unit 803 may be implemented by a memory such as a random access memory (RAM).

A detailed configuration of the optical power detection unit 201 is described below with reference to FIGS. 9A and 9B. FIG. 9A is a diagram illustrating an example of the detailed configuration of the optical power detection unit. As illustrated in FIG. 9A, the optical power detection unit 201 includes a photodetector 901 and an analog/digital converter (ADC) 902. The photodetector 901 performs photoelectric conversion on light output from the wavelength tunable filter 203, and outputs the electrical signal that is obtained by the photoelectric conversion to the ADC 902. The ADC 902 converts the analog electrical signal that is output from the photodetector 901 into a digital electrical signal. The ADC 902 outputs the signal on which AD conversion is performed, to the OSNR monitor control device 202. In such a configuration, the optical power detection unit 201 may detect optical power.

FIG. 9B is a diagram illustrating an example of another detailed configuration of the optical power detection unit. As illustrated in FIG. 9B, the optical power detection unit 201 includes the photodetector 901, the ADC 902, an amplifier 921, and a low-pass filter (LPF) 922. The photodetector 901 outputs an electrical signal that is obtained by the photoelectric conversion, to the amplifier 921. The amplifier 921 amplifies the electrical signal that is output from the photodetector 901.

The amplifier 921 outputs the amplified electrical signal to the LPF 922. The LPF 922 permeates a frequency component of a certain cutoff frequency or less, of the electrical signals that are output from the amplifier 921 into the ADC 902, and cuts off a frequency component that is higher than the cutoff frequency. The ADC 902 converts the analog electrical signal that is output from the LPF 922 into a digital electrical signal. In such a configuration, the optical power detection unit 201 may detect optical power. As described above, as the optical power detection unit 201, the configuration illustrated in FIGS. 9A and 9B may be used.

An operation in the optical network 600 is described below with reference to FIGS. 10 to 16. First, a case in which wavelength setting is performed by the transmission device is described with reference to FIGS. 10 to 12.

Figure 10:
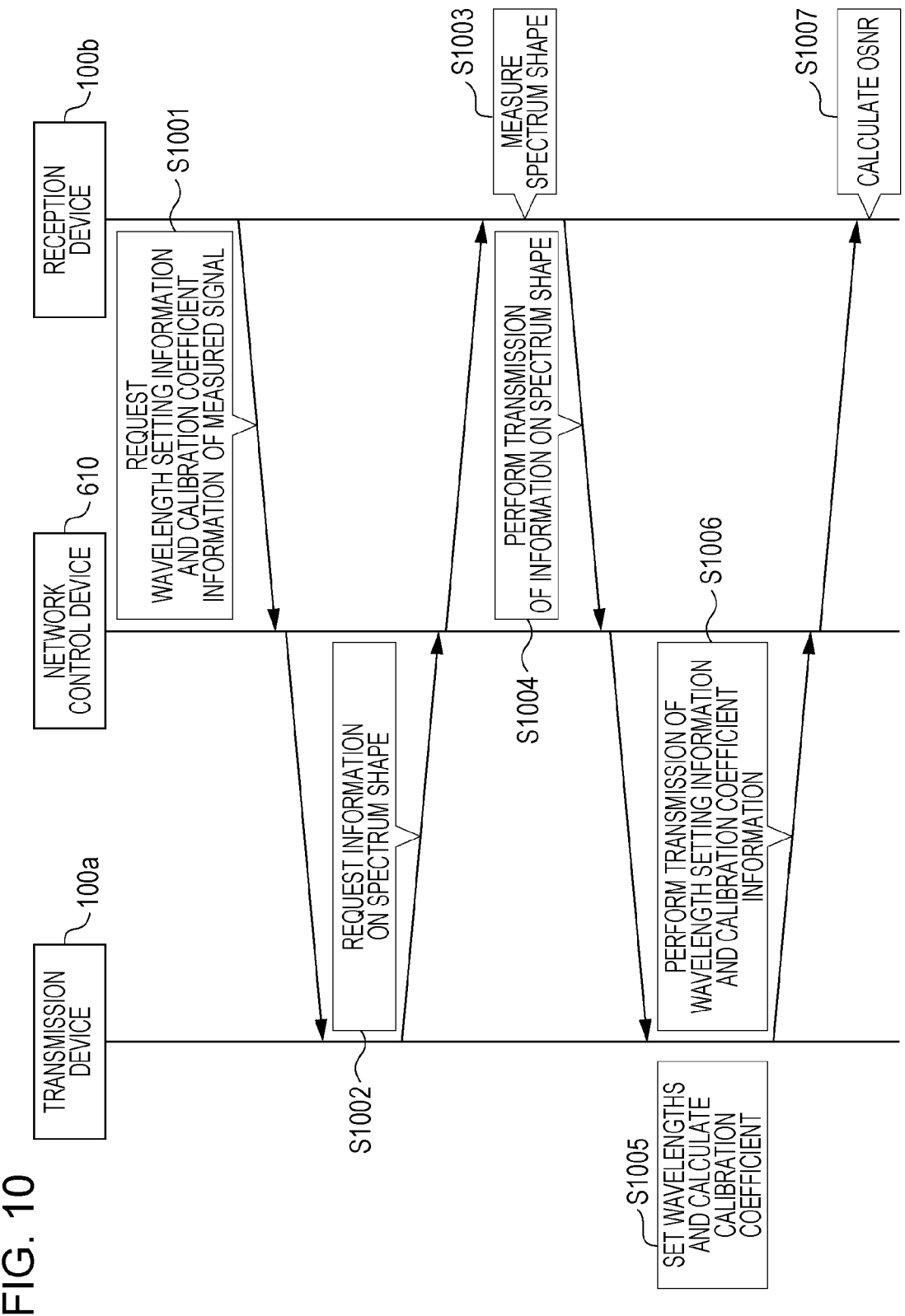
FIG. 10 is a sequence diagram illustrating an example when wavelength setting is performed by the transmission device.

FIG. 10 is a sequence diagram illustrating an example when the wavelength setting is performed by the transmission device. In FIG. 10, first, the reception device 100b requests wavelength setting information and calibration coefficient information of a measured signal, to the transmission device 100a through the network control device 610 (S1001). In response to the request, the transmission device 100a requests information on a spectrum shape to the reception device 100b through the network control device 610 (S1002).

In response to the request, the reception device 100b measures a spectrum shape (S1003) and transmits information on the spectrum shape to the transmission device 100a through the network control device 610 (S1004). In S1001, the reception device 100b may transmit the information on the spectrum shape with the request of the wavelength setting information and the calibration coefficient information of the measured signal. In this case, the processing in Operations S1002 and S1003 may be omitted.

The transmission device 100a sets a first wavelength and a second wavelength and calculates a calibration coefficient using the received information on the spectrum shape (S1005), and transmits the wavelength setting information and the calibration coefficient information to the reception device 100b through the network control device 610 (S1006). The reception device 100b calculates an OSNR using the received wavelength setting information and calibration coefficient information (S1007), and a series of Operations in the sequence diagram ends.

Figure 11:
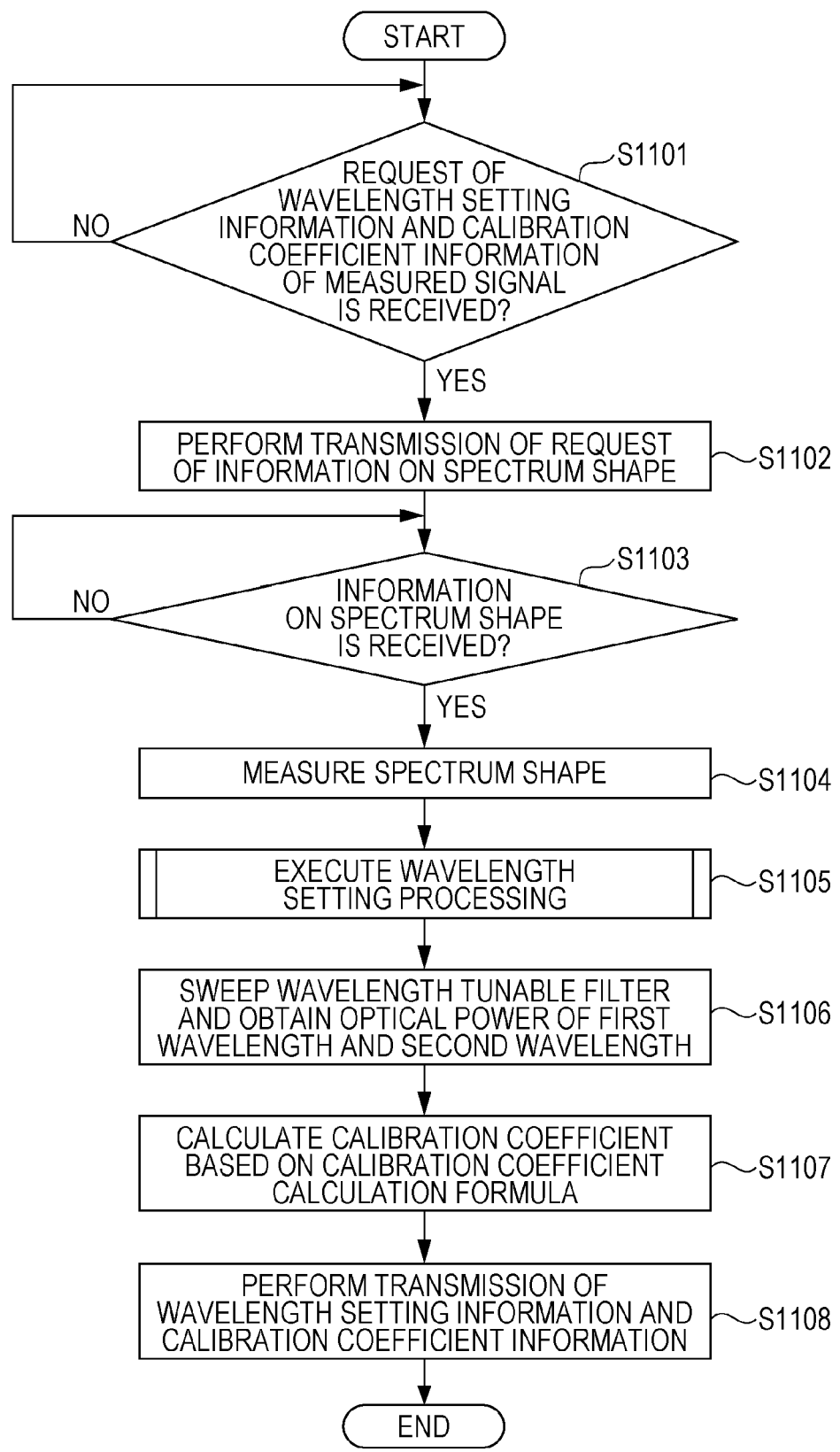
FIG. 11 is a flowchart illustrating an example of processing that is executed by the transmission device.

An example of processing executed by the transmission device 100a in the sequence diagram of FIG. 10 is described below with reference to FIG. 11. FIG. 11 is a flowchart illustrating the example of the processing executed by the transmission device. In FIG. 11, the transmission device 100a determines whether a request of wavelength setting information and calibration coefficient information of a measured signal is received from the reception device 100b through the network control device 610 (S1101).

The transmission device 100a waits until the request of the wavelength setting information and the calibration coefficient information of the measured signal is received (No, in S1101). When the request of the wavelength setting information and the calibration coefficient information of the measured signal is received (Yes, in S1101), the transmission device 100a transmits a request of information on a spectrum shape, to the reception device 100b through the network control device 610 (S1102).

The transmission device 100a determines whether the information on the spectrum shape in the reception device 100b is received from the reception device 100b through the network control device 610 (S1103). The transmission device 100*a* waits until the information on the spectrum shape is received (No, in S1103). When the information on the spectrum shape is received (Yes, in S1103), the transmission device 100*a* measures a spectrum shape in the transmission device 100*a* (S1104) and executes wavelength setting processing of a first wavelength and a second wavelength (S1105). The detailed wavelength setting processing is described later with reference to FIG. 16.

The transmission device 100*a* sweeps the wavelength tunable filter 203 and obtains optical power in the first wavelength and the second wavelength (S1106). The transmission device 100*a* calculates a calibration coefficient on the basis of the calibration coefficient calculation formulas such as the above-described the formulas (7) and (8) (S1107). The transmission device 100*a* transmits the wavelength setting information of the first wavelength and the second wavelength and the calibration coefficient information, to the reception device 100*b* through the network control device 610 (S1108), and a series of steps in the processing illustrated in the flowchart ends.

Figure 12:
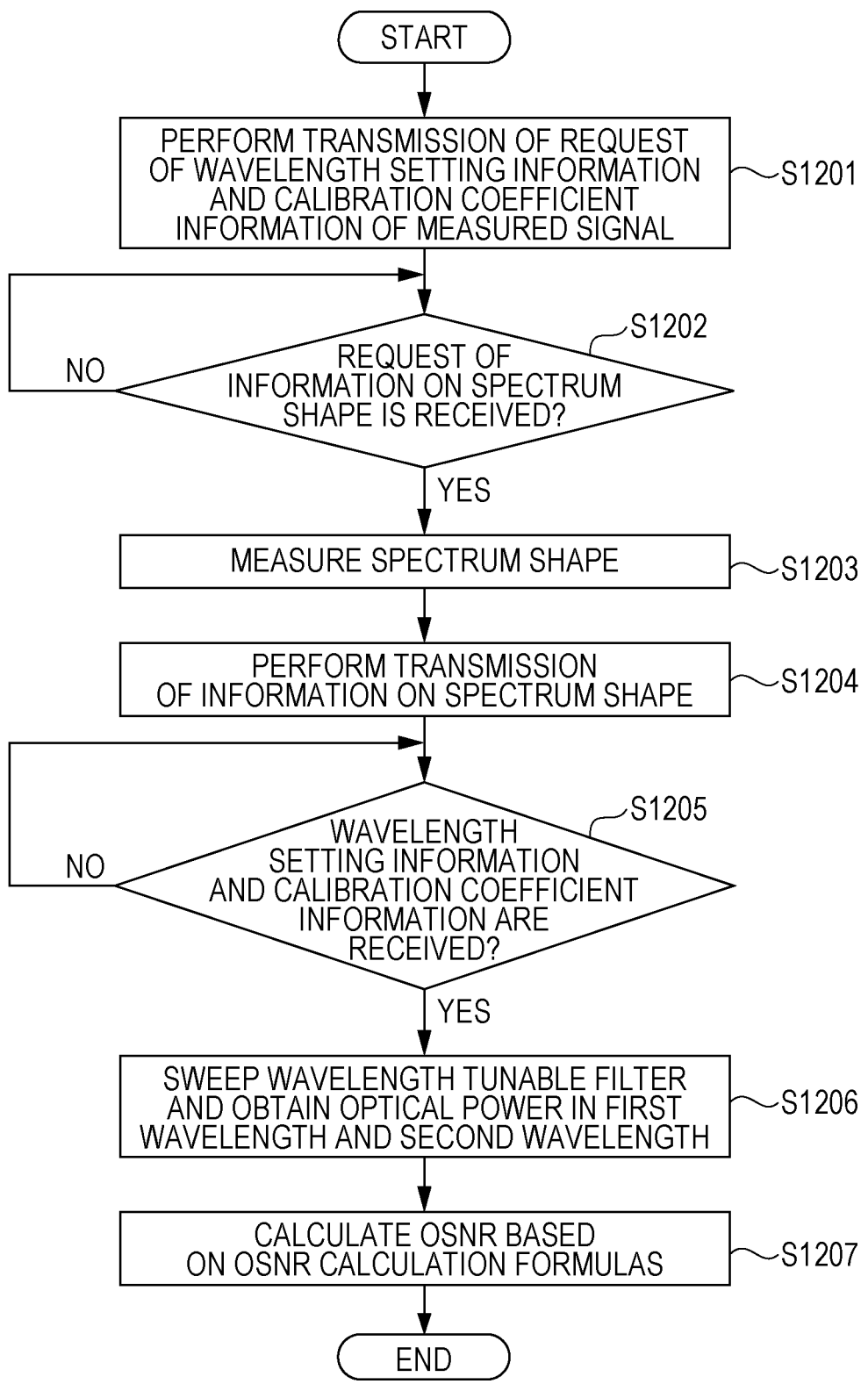
FIG. 12 is a flowchart illustrating an example of processing that is executed by a reception device.

An example of processing that is executed by the reception device 100*b* in the sequence diagram of FIG. 10 is described below with reference to FIG. 12. FIG. 12 is a flowchart illustrating the example of the processing that is executed by the reception device. In FIG. 12, the reception device 100*b* transmits a request of wavelength setting information and calibration coefficient information of a measured signal, to the transmission device 100*a* through the network control device 610 (S1201).

The reception device 100*b* determines whether a request of information on a spectrum shape is received from the transmission device 100*a* through the network control device 610 (S1202). The reception device 100*b* waits until the request of the information on the spectrum shape is received (No, in S1202). When the request of the information on the spectrum shape is received (Yes, in S1202), the reception device 100*b* measures a spectrum shape (S1203).

The reception device 100*b* transmits information on the spectrum shape to the transmission device 100*a* through the network control device 610 (S1204). The processing in S1203 may be executed without waiting until the request of the information on the spectrum shape is received, that is, the processing in S1202 may be omitted.

The reception device 100*b* determines whether the wavelength setting information and the calibration coefficient information are received from the transmission device 100*a* through the network control device 610 (S1205). The reception device 100*b* waits until the wavelength setting information and the calibration coefficient information are received (No, in S1205).

When the wavelength setting information and the calibration coefficient information are received (Yes, in S1205), the reception device 100*b* sweeps the wavelength tunable filter 203 and obtains optical power in the first wavelength and the second wavelength (S1206). The reception device 100*b* calculates an OSNR on the basis of the OSNR calculation formulas such as the above-described formulas (1) to (4) (S1207), and a series of steps in the processing illustrated in the flowchart ends.

An OSNR may be calculated by the above-described processing. In FIGS. 10 to 12, the case is described above in which the wavelength setting is performed in the transmission device 100*a*, and a case is described below in which the wavelength setting is performed in the reception device 100*b* with reference to FIGS. 13 to 15.

Figure 13:
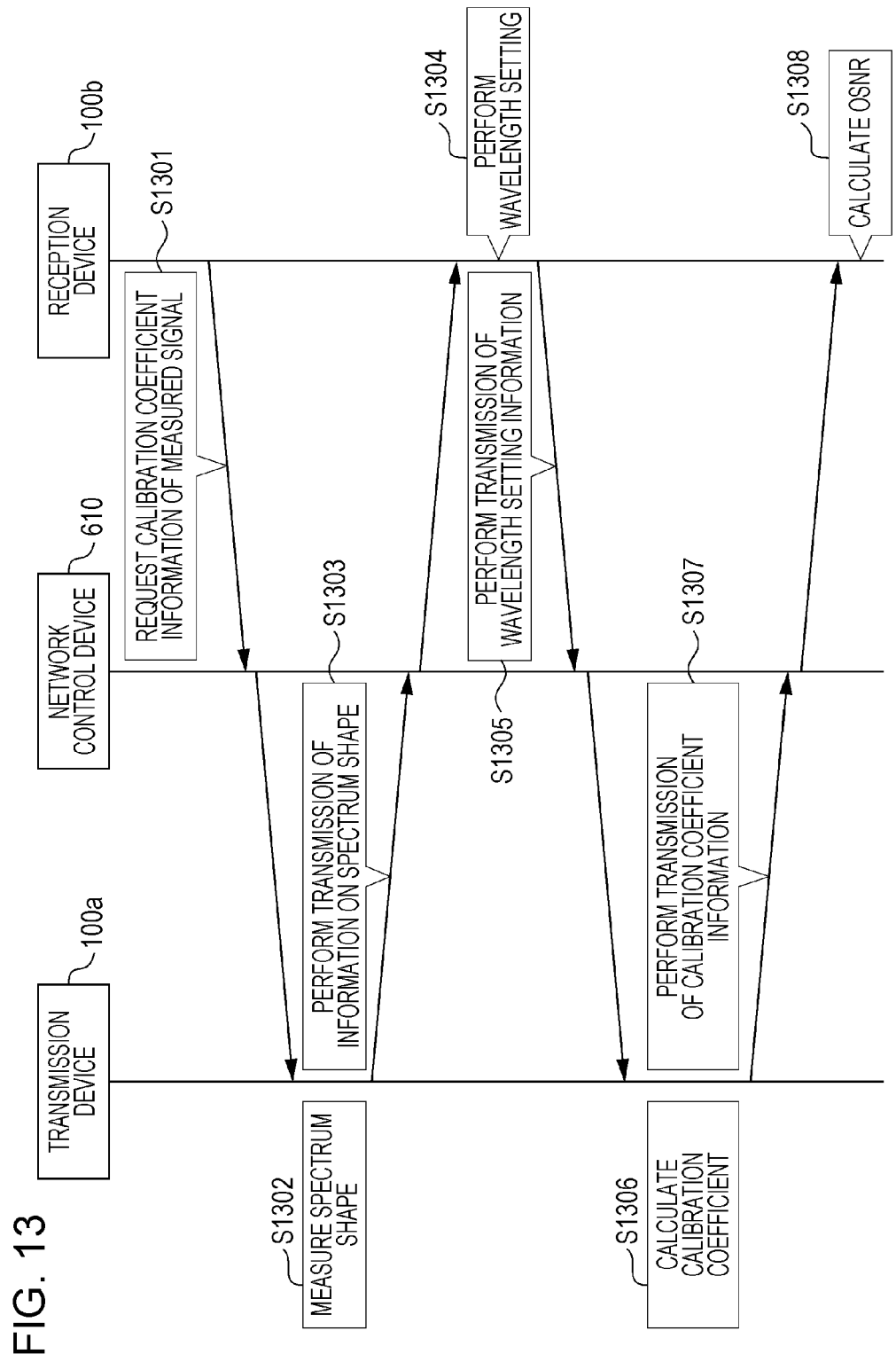
FIG. 13 is a sequence diagram illustrating an example when wavelength setting is performed by the reception device.

FIG. 13 is a sequence diagram illustrating an example when the wavelength setting is performed in the reception device. In FIG. 13, first, the reception device 100*b* requests calibration coefficient information of a measured signal, to the transmission device 100*a* through the network control device 610 (S1301). In response to the request, the transmission device 100*a* measures a spectrum shape (S1302) and transmits information on the spectrum shape to the reception device 100*b* through the network control device 610 (S1303).

The reception device 100*b* executes the wavelength setting processing for a first wavelength and a second wavelength using the received information on the spectrum shape and information on a spectrum shape of the spectrum that is measured in the reception device 100*b* (S1304). The reception device 100*b* transmits wavelength setting information of the first wavelength and the second wavelength, to the transmission device 100*a* through the network control device 610 (S1305).

The transmission device 100*a* calculates a calibration coefficient using the received wavelength setting information (S1306) and transmits calibration coefficient information to the reception device 100*b* through the network control device 610 (S1307). The reception device 100*b* calculates an OSNR using the received calibration coefficient information (S1308), and a series of Operations in the sequence diagram ends.

Figure 14:
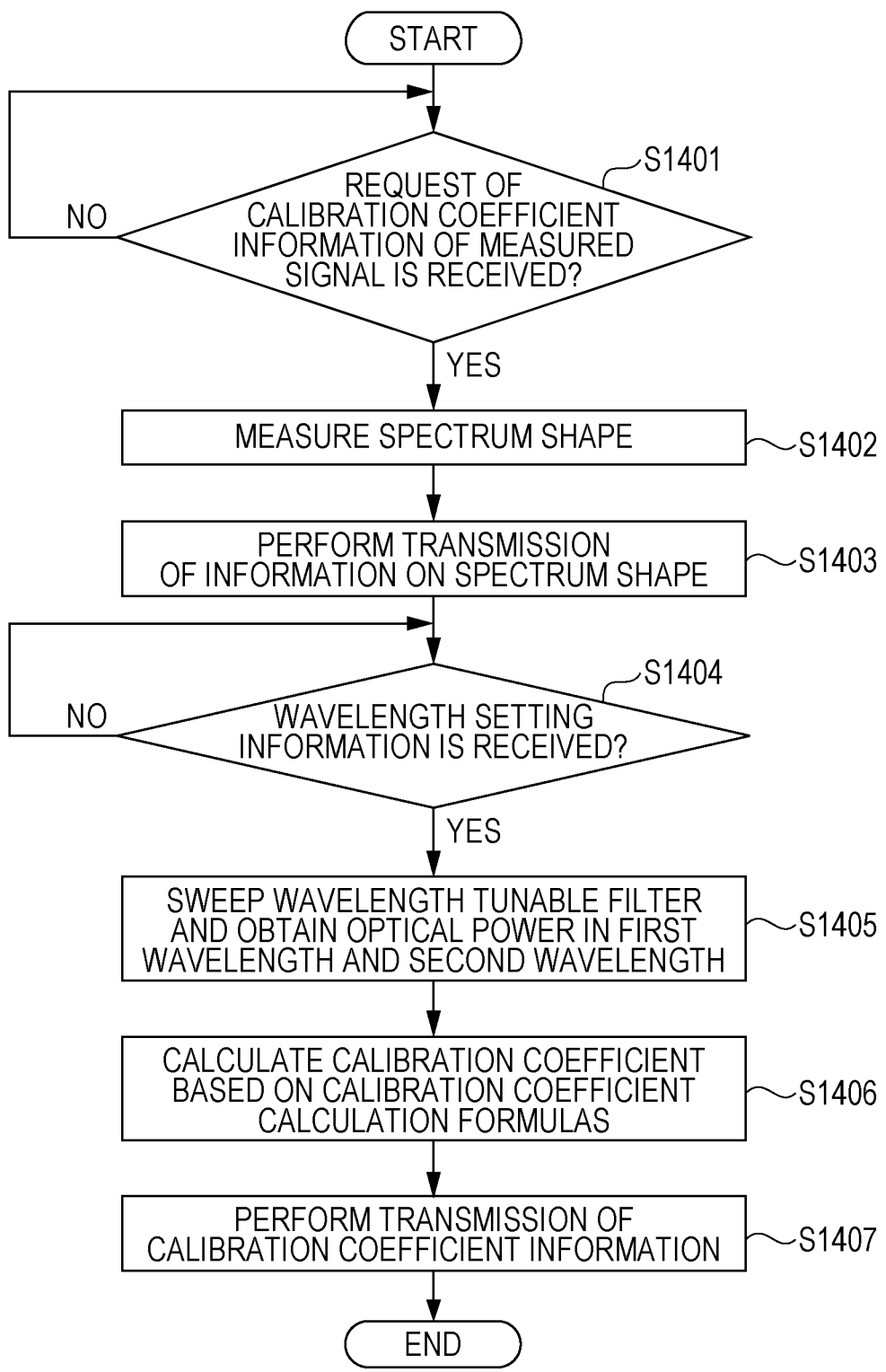
FIG. 14 is a flowchart illustrating an example of processing that is executed by the transmission device.

An example of processing that is executed by the transmission device 100*a* in the sequence diagram of FIG. 13 is describe below with reference to FIG. 14. FIG. 14 is a flowchart illustrating the example of the processing that is executed by the transmission device. In FIG. 14, the transmission device 100*a* determines whether a request of calibration coefficient information of a measured signal is received from the reception device 100*b* through the network control device 610 (S1401).

The transmission device 100*a* waits until the request of the calibration coefficient information of the measured signal is received (No, in S1401). When the request of the calibration coefficient information of the measured signal is received (Yes, in S1401), the transmission device 100*a* measures a spectrum shape (S1402). The transmission device 100*a* transmits information on the spectrum shape to the reception device 100*b* through the network control device 610 (S1403).

The transmission device 100*a* determines whether wavelength setting information of a first wavelength and a second wavelength is received from the reception device 100*b* through the network control device 610 (S1404). The transmission device 100*a* waits until the wavelength setting information is received (No, in S1404). When the wavelength setting information is received (Yes, in S1404), the transmission device 100*a* sweeps the wavelength tunable filter 203 and obtains optical power in the first wavelength and the second wavelength (S1405).

The transmission device 100*a* calculates a calibration coefficient on the basis of the calibration coefficient calculation formulas such as the above-described formulas (7) and (8) (S1406). The transmission device 100*a* transmits calibration coefficient information to the reception device 100*b* through the network control device 610 (S1407), and a series of steps of the processing illustrated in the flowchart ends.

Figure 15:
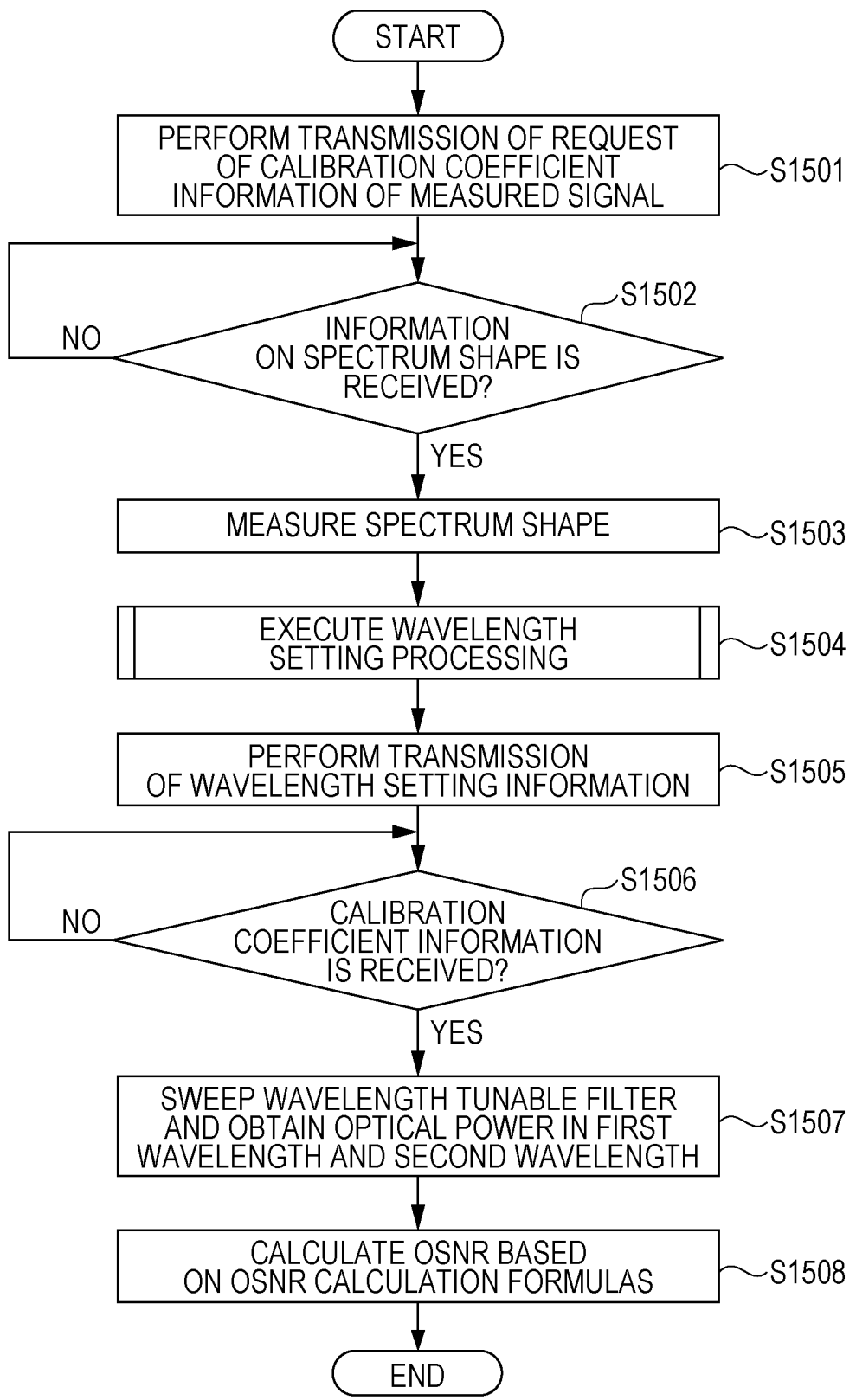
FIG. 15 is a flowchart illustrating an example of processing that is executed by the reception device.

An example of processing that is executed by the reception device 100*b* in the sequence diagram of FIG. 13 is described below with reference to FIG. 15. FIG. 15 is a flowchart illustrating the example of the processing that is executed by the reception device. In FIG. 15, the reception device 100*b* transmits a request of calibration coefficient information of a measured signal to the transmission device 100a through the network control device 610 (S1501).

The reception device 100b determines whether information on a spectrum shape is received from the transmission device 100a through the network control device 610 (S1502). The reception device 100b waits until the information on the spectrum shape in the transmission device 100a is received (No, in S1502). When the information on the spectrum shape is received (Yes, in S1502), the reception device 100b measures a spectrum shape in the reception device 100b (S1503).

The reception device 100b executes wavelength setting processing for a first wavelength and a second wavelength (S1504). The detailed wavelength setting processing is described later with reference to FIG. 16. The reception device 100b transmits wavelength setting information of the first wavelength and the second wavelength to the transmission device 100a through the network control device 610 (S1505).

The reception device 100b determines whether the calibration coefficient information is received from the transmission device 100a through the network control device 610 (S1506). The reception device 100b waits until the calibration coefficient information is received (No, in S1506). When the calibration coefficient information is received (Yes, in S1506), the reception device 100b sweeps the wavelength tunable filter 203 and obtains optical power in the first wavelength and the second wavelength (S1507). The reception device 100b calculates an OSNR on the basis of the OSNR calculation formulas such as the above-described formulas (1) to (4) (S1508), and a series of steps of the processing illustrated in the flowchart ends. An OSNR may be calculated by the above-described processing.

Figure 16:
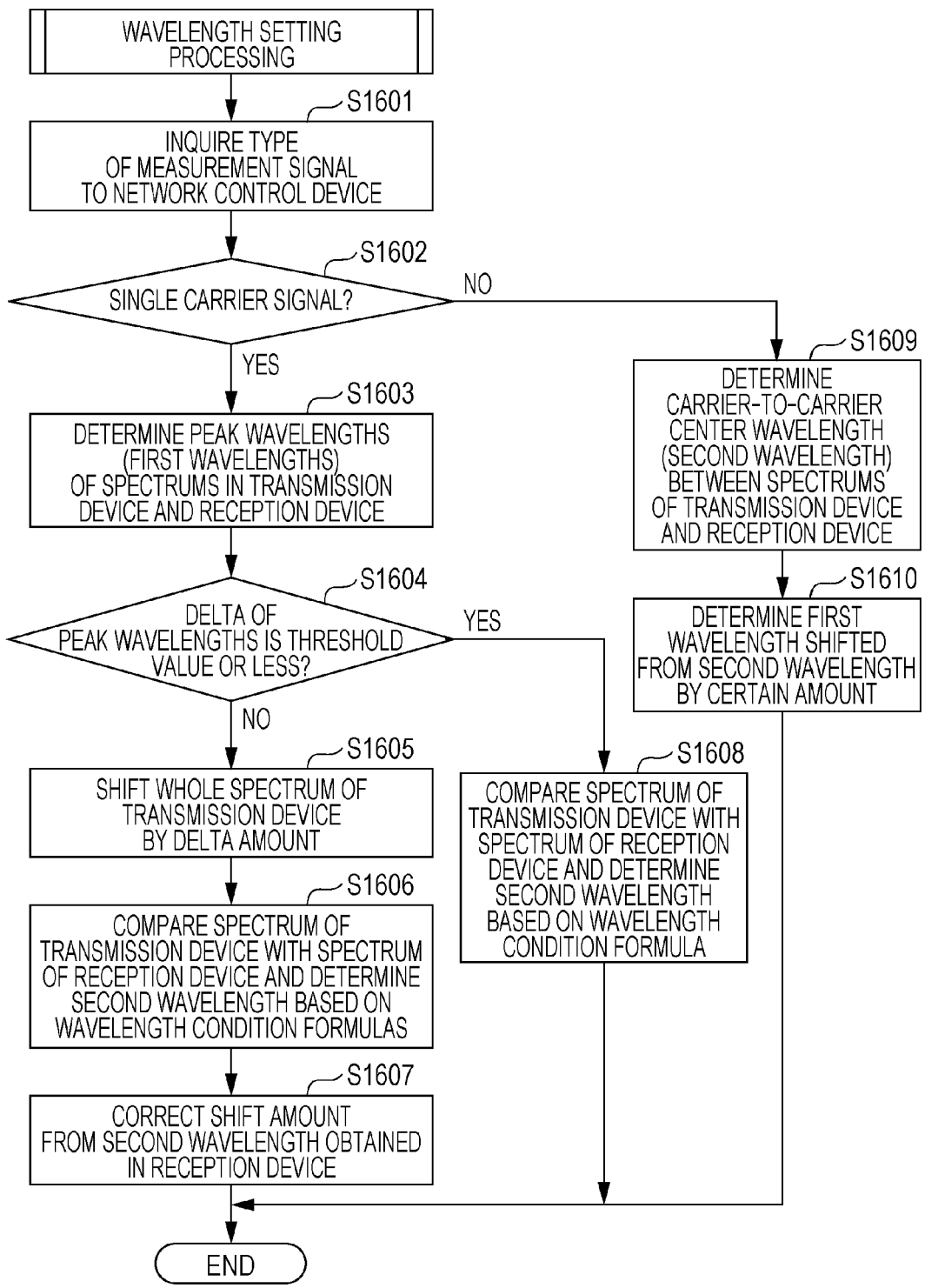
FIG. 16 is a flowchart illustrating the detailed wavelength setting processing.

The wavelength setting processing that is illustrated in S1105 of FIG. 11 and S1504 of FIG. 15 is described below in detail with reference to FIG. 16. In FIG. 16, the transmission device 100a is mainly described for the wavelength setting processing in S1105 of FIG. 11, but the reception device 100b is mainly described for the wavelength setting processing in S1504 of FIG. 15.

FIG. 16 is a flowchart illustrating the detailed wavelength setting processing. In FIG. 16, the transmission device 100a inquires the type of a measured signal to the network control device 610 (S1601). For example, in S1601, the transmission device 100a inquires whether the type of the measured signal is a single carrier signal or a multicarrier signal. As a result of the inquiry in S1601, the transmission device 100a determines whether the type of the measured signal is a single carrier signal (S1602). When the type of the measured signal is a single carrier signal (Yes, in S1602), peak wavelengths (first wavelengths) of the spectrums in the transmission device 100a and the reception device 100b are determined (S1603). Therefore, in the single carrier signal, a wavelength in which the optical power becomes maximum is set as a first wavelength.

After, the transmission device 100a determines whether delta of the peak wavelengths is a threshold value or less (S1604). The delta of the peak wavelengths is a difference between the transmission device 100a and the reception device 100b. The delta of the peak wavelengths is more than the threshold value (No, in S1604), that is, when a difference between the devices is more than the threshold value, the whole spectrum of the transmission device 100a is shifted by delta amount (S1605). In the wavelength setting processing that is executed by the reception device 100b, in the processing in S1605, the whole spectrum of the reception device 100b may be shifted by delta amount.

The transmission device 100a compares the spectrum of the transmission device 100a with the spectrum of the reception device 100b, and determines a second wavelength on the basis of the wavelength condition formulas such as the above-described formulas (5) and (6) (S1606). The transmission device 100a corrects the shift amount (delta amount) by which the whole spectrum is shifted in S1605, from the second wavelength that is obtained in the reception device 100b (S1607), and a series of steps in the processing illustrated in the flowchart ends. Therefore, when there is a deviation between a wavelength in which the power becomes maximum in the first spectrum and a wavelength in which the power becomes maximum in the second spectrum, the first wavelength and the second wavelength may be set by considering such a deviation.

When the delta of the peak wavelengths is the threshold value or less (Yes, in S1604), the transmission device 100a compares the spectrum of the transmission device 100a with the spectrum of the reception device 100b, and determines a second wavelength on the basis of the wavelength condition formula (S1608), and a series of steps in the processing ends. When the delta of the peak wavelengths is less that the threshold value or less, a difference between the devices is the threshold value or less. Therefore, in a single carrier signal, a wavelength that is less affected by spectrum narrowing may be set as the second wavelength.

In S1602, when an optical signal is not a single carrier signal (No, in S1602), the carrier-to-carrier center wavelength (second wavelength) between the spectrums of the transmission device 100a and the reception device 100b is determined (S1609). In such a case, the optical signal is a multi-carrier signal. The transmission device 100a determines a first wavelength that is shifted from the second wavelength by a certain amount (S1610), and a series of steps in the processing illustrated in the flowchart ends. Therefore, in a multi-carrier signal, the center wavelength that is less affected by spectrum narrowing may be set as a second wavelength, and a wavelength in which the optical power becomes maximum may be set as a first wavelength.

As described above, in the embodiments, an OSNR of an optical signal of interest is measured using information on spectrum shapes of the optical signal in the transmission device 100a and the reception device 100b. For example, as indicated in the OSNR calculation formulas such as the formulas (1) to (4), an OSNR is measured using the calibration coefficient d and the power ratio R between the two points of the optical power P1 of the first wavelength and the optical power P2 of the second wavelength in the reception device 100b. Therefore, an OSNR may be obtained with a simple configuration.

In addition, when the optical signal is a single carrier signal, a wavelength in which the power becomes maximum in the spectrum of the optical signal is set as a first wavelength, and a wavelength in which a difference between the power in the first spectrum and the power in the second spectrum is a threshold value or less is set as a second wavelength. For example, the second wavelength is obtained in accordance with the wavelength condition formula of the formula (6). Therefore, a wavelength that is less affected by spectrum narrowing may be set as a second wavelength, and an OSNR may be measured highly accurately regardless of spectrum narrowing.

In addition, the second wavelength is a wavelength that is the farthest from the first wavelength, out of the wavelengths in which a difference between the power in the first spectrum and the power in the second spectrum is a threshold value or less. For example, the second wavelength is set in accordance with the wavelength condition formula of the formula (5). Therefore, a difference between the power in the first spectrum and the power of the second spectrum may be increased, so that the measurement accuracy of an OSNR may be improved.

In addition, when there is a deviation between a wavelength in which the power of the first spectrum becomes maximum and a wavelength in which the power of the second spectrum becomes maximum, wavelength shift is performed on at least one of the spectrums, and the first wavelength and the second wavelength are set on the basis of one of the spectrums, on which the wavelength shift is performed. Therefore, by considering the deviation that occurs between the wavelengths of the transmission device 100a and the reception device 100b, the first wavelength and the second wavelength may be set, and the measurement accuracy of an OSNR may be improved.

In addition, when the optical signal is a multi-carrier signal, a wavelength of a band is set as a second wavelength and a wavelength that is shifted from the second wavelength by a certain amount is set as a first wavelength. Therefore, when a multi-carrier signal is used, an OSNR may be measured highly accurately regardless of spectrum narrowing, and a high transmission capability due to the multi-carrier signal may be obtained.

In addition, in the embodiments, in the transfer device 100, the first wavelength and the second wavelength are set on the basis of the first spectrum information that indicates the shape of the first spectrum and the second spectrum information that indicates the shape of the second spectrum. Therefore, in the transfer device 100, the first wavelength and the second wavelength may be set. The setting of the first wavelength and the second wavelength may be performed in another device such as the network control device 610.

According to an aspect of the embodiments, an OSNR of an optical signal of interest may be obtained with a simple configuration.

Additional Note

Note 1. A measurement device, comprising: a first obtaining unit that obtains a first power ratio that indicates a ratio of optical signal power of a first wavelength in a first spectrum at a reception device to optical signal power of a second wavelength different from the first wavelength in the first spectrum; a second obtaining unit that obtains a second power ratio that indicates a ratio of optical signal power of the first wavelength in a second spectrum at a transmission device to optical signal power of the second wavelength in the second spectrum; a calculation unit that calculates an OSNR of the optical signal at the reception device using the first power ratio obtained by the first obtaining unit and the second power ratio obtained by the second obtaining unit; and an output unit that outputs the OSNR calculated by the calculation unit.

Note 2. The measurement device according to claim 1, wherein the optical signal is a single carrier signal, the first wavelength is a wavelength in the spectrums in which the optical signal power becomes maximum, and the second wavelength is a wavelength in which a difference between the optical signal power of the wavelength in the first spectrum and the optical signal power of the wavelength in the second spectrum is a threshold value or less.

Note 3. The measurement device according to claim 2, wherein the second wavelength is a farthest wavelength from the first wavelength, out of the wavelengths in which the difference is the threshold value or less.

Note 4. The measurement device according to claim 2 further comprising a setting unit that sets the first wavelength and the second wavelength on the basis of first spectrum information on the first spectrum and second spectrum information on the second spectrum.

Note 5. The measurement device according to claim 4, wherein the setting unit sets the first wavelength and the second wavelength on the basis of the first spectrum and the second spectrum in a way that at least one of the spectrums are shifted to reduce the difference in wavelength between signals having peak power in the first spectrum and in the second spectrum.

Note 6. The measurement device according to claim 2, wherein the first obtaining unit obtains the first power ratio on the basis of information on the first wavelength and the second wavelength, the information having been transmitted from the transmission device, and the second obtaining unit obtains the second power ratio on the basis of information on the first wavelength and the second wavelength, the information having been transmitted from the transmission device.

Note 7. The measurement device according to claim 1, wherein when the optical signal is a multi-carrier signal composed of a plurality of carriers having wavelengths that are adjacent to each other with a band in a spectrum, the second wavelength is a wavelength in the band, and the first wavelength is a wavelength that is shifted from the second wavelength by a certain amount.

Note 8. The measurement device according to claim 7 further comprising: a setting unit that sets a wavelength in the band as the second wavelength and sets a wavelength that is shifted from the second wavelength by a certain amount as the first wavelength on the basis of band information on the plurality of carrier signals.

Note 9. A measurement device, comprising: a first obtaining unit that obtains information on a spectrum shape obtained based on information on optical signal power of a first wavelength in a first spectrum at a reception device and information on optical signal power of a second wavelength different from the first wavelength in the first spectrum; a second obtaining unit that obtains information on a spectrum shape obtained based on information on optical signal power of a first wavelength in a second spectrum at a transmission device and information on optical signal power of a second wavelength in the second spectrum; a calculation unit that calculates an OSNR of the optical signal at the reception device using the information on the spectrum shape obtained by the first obtaining unit and the information on the spectrum shape obtained by the second obtaining unit; and an output unit that outputs the OSNR calculated by the calculation unit.

Note 10. A measurement method, comprising: obtaining a first power ratio that indicates a ratio of optical signal power of a first wavelength in a first spectrum at a reception device to optical signal power of a second wavelength different from the first wavelength in the first spectrum; obtaining a second power ratio that indicates a ratio of optical signal power of a first wavelength in a second spectrum at a transmission device to optical signal power of a second wavelength in the second spectrum; calculating an OSNR of the optical signal at the reception device using the obtained first power ratio and the obtained second power ratio; and outputting the calculated OSNR.

Note 11. A transfer device, comprising: a first obtaining unit that obtains a first power ratio that indicates a ratio of optical signal power of a first wavelength in a first spectrum of an optical signal received from a transmission device to optical signal power of a second wavelength different from the first wavelength in the first spectrum; a second obtaining unit that obtains, from the transmission device, a second power ratio that indicates a ratio of optical signal power of the first wavelength in a second spectrum of the optical signal at the transmission device to optical signal power of the second wavelength in the second spectrum; a calculation unit that calculates an OSNR of the received optical signal using the first power ratio obtained by the first obtaining unit and the second power ratio obtained by the second obtaining unit; and an output unit outputs the OSNR that is calculated by the calculation unit.

Note 12. A transfer device, comprising: a first obtaining unit that obtains, from a reception device, a first power ratio that indicates a ratio of optical signal power of a first wavelength in a first spectrum at the reception device to optical signal power of a second wavelength different from the first wavelength in the first spectrum; a second obtaining unit that obtains a second power ratio that indicates a ratio of optical signal power of the first wavelength in a second spectrum at a transmission device to optical signal power of the second wavelength in the second spectrum; a calculation unit that calculates an OSNR of the optical signal at the reception device using the first power ratio obtained by the first obtaining unit and the second power ratio obtained by the second obtaining unit; and an output unit that outputs the OSNR calculated by the calculation unit.

Note 13. An optical network that includes the transfer device according to claim 11, wherein the second obtaining unit obtains the second power ratio from the transmission device through a network control device that is communicable with the transfer device.

Note 14. The optical network that includes the transfer device according to claim 11, wherein the second obtaining unit obtains the second power ratio on the basis of a control signal that is directly received from the transmission device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A measurement device, comprising:
a first obtaining unit configured to obtain a first power ratio that indicates a ratio of optical signal power of a first wavelength in a first spectrum at a reception device to optical signal power of a second wavelength different from the first wavelength in the first spectrum;
a second obtaining unit configured to obtain a second power ratio that indicates a ratio of optical signal power of the first wavelength in a second spectrum at a transmission device to optical signal power of the second wavelength in the second spectrum;
a calculation unit configured to calculate an optical signal-to-noise ratio ("OSNR") of the optical signal at the reception device using the first power ratio obtained by the first obtaining unit and the second power ratio obtained by the second obtaining unit;
an output unit configured to output the OSNR calculated by the calculation unit; and
a setting unit configured to set the first wavelength and the second wavelength based on first spectrum information on the first spectrum and second spectrum information on the second spectrum by performing wavelength shifting on at least one of the first spectrum and the second spectrum in a direction in which a deviation between a wavelength in which power is maximum in the first spectrum and a wavelength in which the power is maximum in the second spectrum is minimized.

2. The measurement device according to claim 1, wherein the optical signal is a single carrier signal,
the first wavelength is a wavelength in the spectrums in which the optical signal power becomes maximum, and
the second wavelength is a wavelength in which a difference between the optical signal power of the wavelength in the first spectrum and the optical signal power of the wavelength in the second spectrum is a threshold value or less.

3. The measurement device according to claim 2, wherein the second wavelength is a farthest wavelength from the first wavelength, out of the wavelengths in which the difference is the threshold value or less.

4. The measurement device according to claim 2, wherein the first obtaining unit obtains the first power ratio on the basis of information on the first wavelength and the second wavelength, the information having been transmitted from the transmission device, and
the second obtaining unit obtains the second power ratio on the basis of information on the first wavelength and the second wavelength, the information having been transmitted from the transmission device.

5. The measurement device according to claim 1, wherein when the optical signal is a multi-carrier signal composed of a plurality of carriers having wavelengths that are adjacent to each other with a band in a spectrum, the second wavelength is a wavelength in the band, and the first wavelength is a wavelength that is shifted from the second wavelength by a certain amount.

6. The measurement device according to claim 5 further comprising:
a setting unit configured to set a wavelength in the band as the second wavelength and sets a wavelength that is shifted from the second wavelength by a certain amount as the first wavelength on the basis of band information on the plurality of carrier signals.

7. A measurement method, comprising:
obtaining a first power ratio that indicates a ratio of optical signal power of a first wavelength in a first spectrum at a reception device to optical signal power of a second wavelength different from the first wavelength in the first spectrum;
obtaining a second power ratio that indicates a ratio of optical signal power of a first wavelength in a second spectrum at a transmission device to optical signal power of a second wavelength in the second spectrum;
calculating an optical signal-to-noise ratio ("OSNR") of the optical signal at the reception device using the obtained first power ratio and the obtained second power ratio; and
outputting the calculated OSNR; and
setting the first wavelength and the second wavelength based on first spectrum information on the first spectrum and second spectrum information on the second spectrum by performing wavelength shifting on at least one of the first spectrum and the second spectrum in a direction in which a deviation between a wavelength in which power is maximum in the first spectrum and a wavelength in which the power is maximum in the second spectrum is minimized.

8. A transfer device, comprising:
a first obtaining unit configured to obtain a first power ratio that indicates a ratio of optical signal power of a first wavelength in a first spectrum of an optical signal received from a transmission device to optical signal power of a second wavelength different from the first wavelength in the first spectrum;
a second obtaining unit configured to obtain, from the transmission device, a second power ratio that indicates a ratio of optical signal power of the first wavelength in a second spectrum of the optical signal at the transmission device to optical signal power of the second wavelength in the second spectrum;
a calculation unit configured to calculate an optical signal-to-noise ratio ("OSNR") of the received optical signal using the first power ratio obtained by the first obtaining unit and the second power ratio obtained by the second obtaining unit;
an output unit outputs the OSNR that is calculated by the calculation unit; and
a setting unit configured to set the first wavelength and the second wavelength based on first spectrum information on the first spectrum and second spectrum information on the second spectrum by performing wavelength shifting on at least one of the first spectrum and the second spectrum in a direction in which a deviation between a wavelength in which power is maximum in the first spectrum and a wavelength in which the power is maximum in the second spectrum is minimized.

9. An optical network that includes the transfer device according to claim 8, wherein
the second obtaining unit obtains the second power ratio from the transmission device through a network control device that is communicable with the transfer device.

10. The optical network that includes the transfer device according to claim 9, wherein
the second obtaining unit obtains the second power ratio on the basis of a control signal that is directly received from the transmission device.

* * * * *

UNITED STATES PATENT AND TRADEMARK OFFICE
CERTIFICATE OF CORRECTION

| | | |
|---|---|---|
| PATENT NO. | : 9,136,944 B2 | Page 1 of 1 |
| APPLICATION NO. | : 14/105960 | |
| DATED | : September 15, 2015 | |
| INVENTOR(S) | : Shoichiro Oda et al. | |

It is certified that error appears in the above-identified patent and that said Letters Patent is hereby corrected as shown below:

Claims

Claim 7, Column 20, Line 54

Delete "ratio; and" and insert --ratio;--, therefor.

Signed and Sealed this
Second Day of February, 2016

Michelle K. Lee
*Director of the United States Patent and Trademark Office*